US012098950B2

(12) United States Patent
Zhou

(10) Patent No.: US 12,098,950 B2
(45) Date of Patent: Sep. 24, 2024

(54) SPECTROMETER AND METHOD OF DETECTING AN ELECTROMAGNETIC (EM) WAVE SPECTRUM

(71) Applicant: National University of Singapore, Singapore (SG)

(72) Inventor: Guangya James Zhou, Singapore (SG)

(73) Assignee: National University of Singapore, Singapore (SG)

(*) Notice: Subject to any disclaimer, the term of this patent is extended or adjusted under 35 U.S.C. 154(b) by 265 days.

(21) Appl. No.: 17/634,451

(22) PCT Filed: Aug. 11, 2020

(86) PCT No.: PCT/SG2020/050464
§ 371 (c)(1),
(2) Date: Feb. 10, 2022

(87) PCT Pub. No.: WO2021/029827
PCT Pub. Date: Feb. 18, 2021

(65) Prior Publication Data
US 2022/0381611 A1    Dec. 1, 2022

(30) Foreign Application Priority Data

Aug. 13, 2019  (SG) .............................. 10201907423S

(51) Int. Cl.
*G01J 3/02*    (2006.01)
*G01J 3/04*    (2006.01)

(52) U.S. Cl.
CPC ........... *G01J 3/0272* (2013.01); *G01J 3/0208* (2013.01); *G01J 3/0216* (2013.01); *G01J 3/0229* (2013.01); *G01J 3/04* (2013.01); *G01J 2003/045* (2013.01)

(58) Field of Classification Search
CPC .......... G01J 3/0216; G01J 3/0229; G01J 3/04; G01J 2003/045; G01J 3/06; G01J 3/18; G01J 3/2846
See application file for complete search history.

(56) References Cited

U.S. PATENT DOCUMENTS 3,578,980 A    5/1971  Decker et al.
3,720,469 A *  3/1973  Harwit .................. G01J 3/2823
                                                356/310

(Continued)

FOREIGN PATENT DOCUMENTS

CN         103090971 A     5/2013
WO    WO-2009046904 A1 *  4/2009 ............. G02B 26/02

OTHER PUBLICATIONS

Vickers, Thomas J., Charles K. Mann, and Jianxiong Zhu. "Hadamard multiplex multichannel spectroscopy to achieve a spectroscopic power distribution advantage." Applied spectroscopy 45.1 (1991): 42-49 (Year: 1991).*

(Continued)

*Primary Examiner* — Tarifur R Chowdhury
*Assistant Examiner* — Roberto Fabian, Jr.
(74) *Attorney, Agent, or Firm* — Michael Best & Friedrich LLP

(57) ABSTRACT

A spectrometer for detecting an electromagnetic (EM) wave spectrum having one or more wavelength components within a spectral band of interest, and a method of detecting an electromagnetic (EM) wave spectrum having one or more wavelength components within a spectral band of interest. The method uses an entrance aperture; a dispersion and imaging optics containing at least one dispersion element; an exit aperture; a collection optics; and at least one single-pixel detector, each single-pixel detector sensitive to one or more of the wavelength components; and the method com- (Continued)

prises the steps of spatially encoding at least one entrance slit of the entrance aperture along a direction substantially transverse to a direction of dispersion of the dispersion and imaging optics; creating, using the dispersion and imaging optics, dispersed images of the entrance aperture on a plane of the exit aperture, such that respective images at the different wavelength components are offset by different amounts of displacements along the direction of dispersion; spatially encoding a plurality of exit slits of the exit aperture along the direction substantially transverse to the direction of dispersion, wherein the exit aperture comprises a plurality of exit slits arranged in the direction of dispersion; gathering, using the collection optics, a total EM wave energy that enters the entrance aperture and exits the exit aperture to one of the at least one single-pixel detectors; changing at least one of an encoding pattern of the at least one entrance slits and an encoding pattern of the plurality of exit slits for a number of times; and measuring the output of the at least one detector for respective ones of the number of times for reconstructing the EM wave spectrum.

17 Claims, 24 Drawing Sheets

(56) References Cited

U.S. PATENT DOCUMENTS

| | | | |
|---|---|---|---|
| 5,416,325 A * | 5/1995 | Buontempo | G01J 3/453 250/353 |
| 7,505,130 B2 | 3/2009 | Brady et al. | |
| 7,652,765 B1 | 1/2010 | Geshwind et al. | |
| 8,144,320 B2 | 3/2012 | Potuluri et al. | |
| 10,222,260 B2 | 3/2019 | McQuilkin et al. | |
| 2014/0268139 A1* | 9/2014 | Smith | G01J 3/0272 29/592 |

OTHER PUBLICATIONS

Book Ref.: Robert John Bell, "Introductory Fourier Transform Spectroscopy", 1972 Academic Press pp. 33-44.
Book Ref.: Martin Harwit, et al. "Hadamard Transform Optics", 1979, Academic Press pp. 44-62.
Candes et al., "Stable Signal Recovery from Incomplete and Inaccurate Measurements", Feb. 2005 Revised Jun. 2005, (15 Pages).
Decker, "Experimental Realization of the Multiplex Advantage with a Hadamard-Transform Spectrometer", Applied Optics vol. 10 No. 3, Mar. 1971, pp. 510-514.
DeVerse et al., "An improved Hadamard encoding mask for multiplexed Raman imaging using single channel detection", Journal of Molecular Structure vol. 521, 2000, dated Apr. 13, 1999, pp. 77-88.
Edgar et al., "Simultaneous real-time visible and infrared video with single-pixel detectors", Scientific Reports, website: www.nature.com/scientificreports, May 22, 2015, (8 Pages).
Gehm et al., "Satic two-dimensional aperture coding for multimodal, multiplex spectroscopy", Applied Optics vol. 45 No. 13, May 1, 2006, pp. 2965-2974.
Girard, "Spectrometre a Grilles", Applied Optics vol. 2 No. 1, Jan. 1963, pp. 79-88.
Golay, "Static Multislit Spectrometry and Its Application to the Panoramic Display of Infrared Spectra", Journal of the Opical Society of America vol. 41, No. 7, Jul. 1951, pp. 468-472.
Hartwit et al., "Two Asymmetric Hadamard Transform Spectrometers", Applied Optics vol. 13, No. 13, Nov. 1974, pp. 2669-2674.
Harwit et al., "Doubly Multiplexed Dispersive Spectrometers", Applied Optics vol. 9 No. 5, May 1970, pp. 1149-1154.
Huang et al., "Miniaturized NIR Spectrometer Based on Novel MOEMS Scanning Tilted Grating", Sep. 20, 2018, Micromachines vol. 9 No. 478, (9 Pages).
Ibbett et al., "Real-Time Multiplexing of Dispersed Spectra in Any WavelengthRegion", Applied Optics vol. 7 No. 6, Jun. 1968, pp. 1089-1094.
Lu et al., "The Improvement on the Performance of DMD Hadamard Transform Near-Infrared Spectrometer by Double Filter Strategy and a New Hadamard Mask", Micromachines vol. 10 No. 147, 2019 (13 Pages).
Pt Serviam Abadimurni, "MIR8035™ FT-IR Spectrometer", website: https://sa-photonics.com/products/spectroscopy-systems/modular-ir-fourier-spectrometers-2/, obtained Oct. 31, 2019 (5 Pages).
Sun et al., "Improving the signal-to-noise ratio of single-pixel imaging using digital microscanning", Optics Express vol. 24 No. 10, May 16, 2016 (10 Pages).
Texas Instruments, "DLP® Technology for Spectroscopy", White Paper DLPA048A, Feb. 2014 Revised Aug. 2016, (9 Pages).
Texas Instruments, "Introduction to ±12 Degree Orthogonal Digital Micromirror Devices (DMDs)", Chapter 1 DLPA008A, Feb. 2018 (13 Pages).
Wikipedia, "Circulant matrix" website: https://en.wikipedia.org/wiki/Circulant_matrix, obtained Oct. 31, 2019, (5 Pages).
Wikipedia, "Moore-Penrose inverse", website: https://en.wikipedia.org/wiki/Moore-Penrose_inverse, obtained Oct. 31, 2019, (11 Pages).
Wikipedia, "Nonimaging optics", website: https://en.wikipedia.org/wiki/Nonimaging_ optics, obtained Oct. 31, 2019, (12 Pages).
Xu et al., "SNR analysis and Hadamard mask modification of DMD Hadamard Transform Near-Infrared spectrometer", Optics Communications 383, 2017, pp. 250-254.
Singapore Patent Office Search report and Written opinion for the Application No. 11202113373T dated on Aug. 11, 2023 (8 pages).
International Search Report and Written Opinion for Application No. PCT/SG2020/050464 dated Nov. 20, 2020 (8 pages).

* cited by examiner

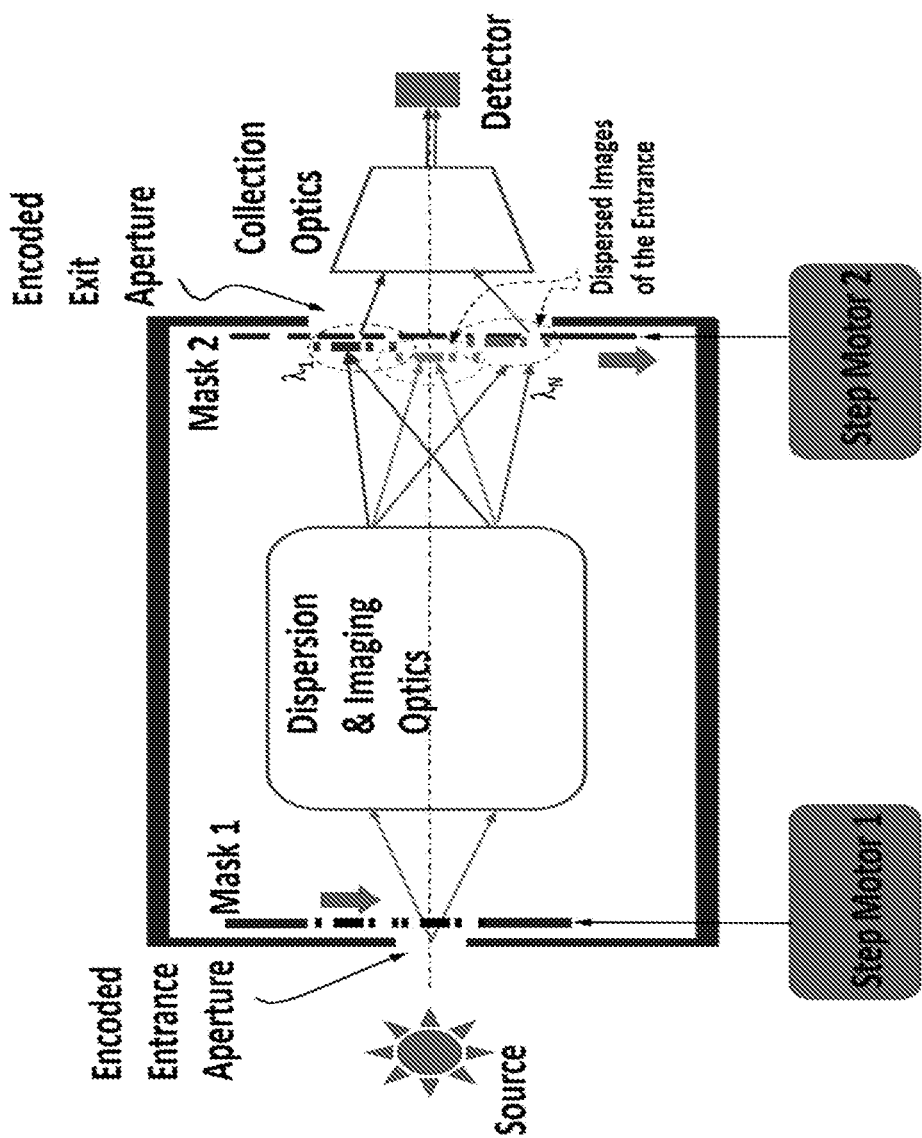
Figure 4 (b) (prior art)

SPECTROMETER AND METHOD OF DETECTING AN ELECTROMAGNETIC (EM) WAVE SPECTRUM

CROSS REFERENCE TO RELATED APPLICATIONS

This application is a national stage filing under 35 U.S.C. § 371 of International Patent Application No.: PCT/SG2020/050464, filed Aug. 11, 2020, which claims priority to Singapore Patent Application No. 10201907423S, filed Aug. 13, 2019, the entire contents of all of which are hereby incorporated by reference herein.

FIELD OF INVENTION

The present invention relates broadly spectrometers, specifically, but not limited to, portable high-throughput spectrometers suitable for field uses.

BACKGROUND

Any mention and/or discussion of prior art throughout the specification should not be considered, in any way, as an admission that this prior art is well known or forms part of common general knowledge in the field.

Fourier transform infrared (FTIR) spectrometers are used in a wide range of sensing applications, however they are bench-top instruments typically used in controlled laboratory environments. They are essentially optical interferometers susceptible to external disturbances and contain precision optomechanical scanning mechanisms, which make them difficult to be miniaturized for portable field uses.

On the other hand, there is an increasing demand for portable spectrometers (particularly IR spectrometers) for field uses in various sensing applications in food and beverage quality assessment, environmental monitoring, precision agriculture, industrial process control, internet of things, biomedical point of care testing, and many others.

Infrared (IR) spectroscopy is widely used in chemical detection and analysis owing to its superior specificity and sensitivity. Molecules can be identified/detected by their unique optical absorption characteristics. In recent years, there is an increasing demand on portable IR spectrometers for field uses in a wide range of applications including environmental monitoring, food and drink quality assessment, Internet-of-things (IOT), pharmaceutical screening, and many others.

(i) Simplest dispersive spectrometers

As shown FIG. 1, dispersive spectrometers are commonly used in visible (VIS) and near IR (NIR) spectral regions. Light passing through a slit is first collimated by a mirror and directed to a diffraction grating, where its spectral components ($\lambda_1$ to $\lambda_N$) are diffracted to different angles. These diffracted beams are then focused by another mirror to a linear detector array, where different spectral components fall on different pixels to be recorded. The dispersive spectrometers work well in VIS/NIR regions, but have the following disadvantages in mid IR (MIR) and far IR (FIR) regions, where molecules typically exhibit characteristic absorptions (MIR/FIR is therefore also called, and referred to herein, as molecular "finger-printing" region):

(1) Detector arrays become less efficient in photon detection and also much more expensive in MIR and FIR regions.

(2) Throughput (or Etendue), i.e. the ability of an instrument to gather the light energy, is not high enough. As shown in the FIG. 1, a narrow slit (i.e. small width $L_s$) has to be used for high spectral resolution, thus limiting the light input to the spectrometer. This can be easily understood in the following way: If $L_s$ is increased (in other words, more light power is gathered), its corresponding image $L_s'$ at each wavelength is also broadened thus reducing the spectral resolution.

(3) Distributing already limited light energy to multiple locations further weakens the signal at each pixel of the detector array. This, coupled with high dark current of the photodetector in MIR and FIR region, significantly reduces the spectrometer's SNR.

(ii) Fourier transform infrared (FTIR) spectrometers

Therefore, traditionally, FTIR spectrometers are used in MIR and FIR regions [1]. As shown in FIG. 2, Michelson interferometers are frequently used for construction of FTIR spectrometers. In a FTIR system, the movable mirror is scanned over a range L and the interferometer output light intensity variation 48) is recorded as a function of the optical path difference (OPD) δ, which is usually called the interferogram. It can be shown that the light source power spectrum $I_\sigma$ and the recorded interferogram I(δ) are related by a Fourier transform:

$$I_\sigma \propto \int_{-\infty}^{\infty} [I(\delta) - 0.5I(0)] \exp(-i2\pi\sigma\delta) d\delta, \quad (1)$$

where σ is the wavenumber. FTIR has many advantages over dispersive spectrometers. The most notable ones are the multiplexing advantage (uses a single-pixel detector with multiplexed light energy falling on it thereby enhancing the SNR) and high-throughput advantage (the ability to gather more light energy compared with the dispersive spectrometers). However, FTIRs are usually bench-top instruments typically used in controlled laboratory environments. Miniaturization of those FTIRs and making them portable for field use would be very attractive for a range of applications including food quality assessment, environmental monitoring, and point of care testing. However, over the past decades, it has been seen that making a portable high-quality FTIR is challenging. The main reasons are as follows:

(1) A FTIR is essentially an optical interferometer that contains two optical paths. As shown in FIG. 2, if there are external disturbances (temperature, air flow, vibration, etc.) in path A or path B or both, even with the slightest ones, this will significantly affect the recorded interferogram, thereby increasing noises in the reconstructed spectrum.

(2) A FTIR also contains moving mirrors, requiring high precision alignment/positioning and which are also vulnerable to external disturbances.

(3) A FTIR's throughput, although higher than the dispersive spectrometers, is still limited. This can be understood in the following way: The FTIR's working principle requires optical beams in the interferometer to be collimated. It is shown that the maximum allowable half-angle $\alpha_{max}$ has to fulfil the following:

$$\alpha_{max} = \sqrt{\frac{\delta\sigma}{\sigma_{max}}} \quad (2)$$

where δσ is the resolution in wavenumber and $\sigma_{max}$ is the maximum wavenumber of the spectrometer. Usually, this $\alpha_{max}$ is quite small, for example the input maximum divergence half-angle is 0.5° for Oriel® Modular FT-IR Spectrometers MIR8035™ [2]. Assuming a collimating lens with a focal length of 50 mm as shown in FIG. 2, one can easily estimate the allowable aperture size/diameter $D_s$ to be 0.88 mm, which is small in terms of gathering optical radiation energy.

These limitations collectively make the miniaturization of a FTIR for field uses, while maintaining its high spectral resolution at IR wavelengths, challenging.

(iii) Coded Aperture Spectrometers

Coded aperture spectrometer represents a recent development in the area of spectroscopic sensing technology [3]. As shown in FIG. 3, the coded aperture spectrometer is quite similar to a traditional grating spectrometer shown in FIG. 1, except that the narrow entrance slit is replaced with a much wider coded aperture. This replacement results in many "overlapping" images of the aperture on the detector array (or image sensor) plane, with different wavelengths at different locations. By assuming the aperture is uniformly illuminated, the light spectrum can then be reconstructed using these "overlapping" images of the coded aperture recorded by the image sensor. The main advantage of this approach is that it decouples spectral resolution with the instrument throughput. In other words, the spectral resolution is set by the smallest feature of the coded aperture, while the throughput is set by the overall size of the aperture. However, as seen from its schematic shown in FIG. 3, it still uses a detector array for sensing, hence one of the main limitations of this approach is that:

Due to the fact that detector arrays have lower pixel counts (or lower resolution) and become less efficient in photon detection and also much more expensive in MIR and FIR wavelength regions, coded aperture spectrometers are mostly used in VIS-NIR systems and not for MIR and FIR wavelengths.

(iv) Multiplexing Mask Spectrometers

Multiplexing mask spectrometers were proposed decades ago, and they are designed to sense light spectrum with a single-pixel detector and thus can be applied to IR and other wavelengths conveniently. These spectrometers can be categorized into two configurations. The first configuration (also known as singly encoded spectrometers), as shown in FIG. 4(a), only encodes the light radiation at the exit aperture [4]. The light passing through a narrow slit is dispersed and imaged to the exit aperture, where a moving mask (usually designed with Hadamard encoding) is placed immediately before or after the exit aperture to encode the light.

After the encoding, the light is collected by a collection optics and received by a single-pixel detector. The light spectrum is reconstructed from the data recorded by the single-pixel detector. This system has the multiplexing advantage (allowing multiple wavelengths to reach the detector simultaneously) but not the throughput advantages because the narrow slit limits the amount of light energy that can be collected by the spectrometer.

The second configuration (also known as doubly encoded spectrometers) shown schematically in FIGS. 4(b) and 4(c) involves the encoding of both the entrance and exit apertures. Early designs including Golay's multi-slit spectrometers [5] and Girard's Grill spectrometers [6] have the throughput advantage to collect the increased amount of light energy via enlarged apertures, however they lose the multiplexing advantage. Subsequent research and development then centered on encoders based on Hadamard matrices, which led to multiplexing mask spectrometers having both multiplexing and throughput advantages [7].

Two designs of the second configuration are further highlighted in FIGS. 4(b) and 4(c), respectively. In these designs, the entrance and exit apertures are both encoded with masks containing multiple slits, with some slits open to pass the light and some closed to block the light. The source radiation passing through the spectrometer is thus encoded twice. The design in FIG. 4(b) utilizes the movements of two masks driven by two step motors to generate the encoding patterns dynamically both at the entrance and exit aperture [8]. A series of encoding patterns are created by stepping the mask containing multiple slits through the aperture opening. The design in FIG. 4(c), however, uses only one movable mask at the entrance to encode the light and keeps the mask at the exit aperture fixed [9]. For both designs shown in FIGS. 4(b) and 4(c), the light spectrum can then be reconstructed from the data recorded by the single-pixel detector at various encoding settings.

For the design shown in FIG. 4(a), the major limitations are highlighted as follows:

(1) The spatial separation of the slit images from $\lambda_1$ to $\lambda_N$ on the exit aperture plane needs to be large in order to achieve high spectral resolution, which translates to the requirement of a wide exit aperture and thus a large translational movement of the encoding mask. This makes the design implemented with motors difficult to be miniaturized for field uses.

(2) It is noted that the use of microelectromechanical systems (MEMS) based mirrors and mirror arrays to replace the encoding slit masks driven by motors has gained significant interest in recent years. The encoding patterns can be implemented dynamically by switching on or off rows/columns of micromirrors. Typical designs using digital micromirror device (DMD) from Texas Instruments (TI) can be found in a number of recent publications [10] [11]. These designs can be potentially miniaturized, however, encoding only the exit aperture does not have the high throughput because the amount of light energy that can enter the spectrometer is limited severely by the narrow slit or pinhole at the entrance aperture.

For the designs shown in FIGS. 4(b) and 4(c), the entrance aperture is encoded and has an extended area. Thus, such designs have both the throughput and multiplexing advantages, which potentially could enable high performance spectrometers. However, their major limitations are highlighted as follows:

(1) For the design in FIG. 4(b), the driving mechanism is complex involving the movement control and synchronization of two encoding masks, therefore this design is difficult to be miniaturized for field uses.

(2) For the design in FIG. 4(c), the entrance aperture consists of N slits and exit aperture consists of (2N−1) slit. The encoding scheme is based on the assumption that the light entering $i^{th}$ slit and exiting the $j^{th}$ slit has the same wavelength as the light entering $(i+t)^{th}$ slit and exiting the $(j+t)^{th}$ slit for any integer number t. The entire encoding/decoding scheme is based on this assumption. Its implication is illustrated in FIG. 5(a). The wavelength components of light $\lambda_1, \lambda_2, \ldots, \lambda_N$ going through the first entrance slit should exit the $1^{st}, 2^{nd}, \ldots, N^{th}$ exit slit, respectively. In addition, the wavelengths going from $2^{nd}$ entrance slit to $2^{nd}$ exit slit, from $3^{rd}$ entrance slit to $3^{rd}$ exit slit, . . . , and from $N^{th}$ entrance slit to $N^{th}$ exit slit, should be the same and they should be equal to wavelength $\lambda_1$. In other words, the overall width of the entrance aperture is directly proportional to the total spatial separation of wavelength components on the exit aperture plane as shown in FIG. 5(a). In a typical high-resolution spectrometer, this spatial separation of wavelength components is indeed quite large as illustrated in FIG. 5(b) with an Ocean optics' USB model VIS-NIR spectrometer as an example. The direct result is an excessively large entrance aperture that makes miniaturization of overall instrument size and balancing of optical aberrations for high performance portable spectrometers difficult to achieve. It should be noted that the abovementioned assumption, on which the system in FIG. 4(c) is based, in fact couples the throughput with the spectral resolution thus making a portable yet high-resolution design challenging.

Embodiments of the present invention provide methods and systems that seek to address at least one of the above problems.

SUMMARY

In accordance with a first aspect of the present invention, there is provided a spectrometer for detecting an electromagnetic (EM) wave spectrum having one or more wavelength components within a spectral band of interest, comprising:
  an entrance aperture;
  a dispersion and imaging optics containing at least one dispersion element;
  an exit aperture;
  a collection optics; and
  at least one single-pixel detector, each single-pixel detector sensitive to one or more of the wavelength components;
  wherein the entrance aperture comprises at least one entrance slit that is spatially encoded along a direction substantially transverse to a direction of dispersion of the dispersion and imaging optics;
  wherein the dispersion and imaging optics is configured to create dispersed images of the entrance aperture on a plane of the exit aperture, such that respective images at the different wavelength components are offset by different amounts of displacements along the direction of dispersion;
  wherein the exit aperture comprises a plurality of exit slits arranged in the direction of dispersion, where each exit slit is spatially encoded along the direction substantially transverse to the direction of dispersion;
  wherein the collection optics is configured to gather a total EM wave energy that enters the entrance aperture and exits the exit aperture to one of the at least one single-pixel detectors;
  wherein at least one of an encoding pattern of the at least one entrance slits and an encoding pattern of the plurality of exit slits is adjustable and configured to be changed for a number of times;
  the spectrometer further comprising a measurement unit configured to measure the output of the at least one detector for respective ones of the number of times for reconstructing the EM wave spectrum.

In accordance with a second aspect of the present invention there is provided a method of detecting an electromagnetic (EM) wave spectrum having one or more wavelength components within a spectral band of interest, using:
  an entrance aperture;
  a dispersion and imaging optics containing at least one dispersion element;
  an exit aperture;
  a collection optics; and
  at least one single-pixel detector, each single-pixel detector sensitive to one or more of the wavelength components;

the method comprising the steps of:
  spatially encoding at least one entrance slit of the entrance aperture along a direction substantially transverse to a direction of dispersion of the dispersion and imaging optics;
  creating, using the dispersion and imaging optics, dispersed images of the entrance aperture on a plane of the exit aperture, such that respective images at the different wavelength components are offset by different amounts of displacements along the direction of dispersion;
  spatially encoding a plurality of exit slits of the exit aperture along the direction substantially transverse to the direction of dispersion, wherein the exit aperture comprises a plurality of exit slits arranged in the direction of dispersion;
  gathering, using the collection optics, a total EM wave energy that enters the entrance aperture and exits the exit aperture to one of the at least one single-pixel detectors;
  changing at least one of an encoding pattern of the at least one entrance slits and an encoding pattern of the plurality of exit slits for a number of times; and
  measuring the output of the at least one detector for respective ones of the number of times for reconstructing the EM wave spectrum.

BRIEF DESCRIPTION OF THE DRAWINGS

Embodiments of the invention will be better understood and readily apparent to one of ordinary skill in the art from the following written description, by way of example only, and in conjunction with the drawings, in which.

DETAILED DESCRIPTION

Embodiments of the present invention can provide miniature spectrometers that can have one or more of the following distinct advantages.

Unlike FTIR, embodiments of the present invention are not based on optical interferometers hence they can be more robust and less sensitive to external disturbances, thus suitable for field-use.

Embodiments of the present invention can have an enlarged entrance aperture compared with a typical slit or pinhole used in a conventional grating or prism based dispersive spectrometer thus allowing a significantly enhanced light-gathering power.

Embodiments of the present invention can use a single-pixel photodetector or multiple single-pixel photodetectors hence can be cost-effectively operated at UV and/or IR wavelengths, where image sensors/detector arrays are expensive.

Embodiments of the present invention can have the multiplexing advantage hence supporting high SNR detection.

Generally, embodiments of the present invention are related to a type of spectrometers that is portable and suitable for field uses. These spectrometers according to example embodiments can have large entrance apertures and therefore have high throughput (or Etendue) resulting in high signal-to-noise ratio (SNR). They also use a single-pixel (or single-element) multiplexing detection technology and therefore they can be conveniently applied with low-cost to UV, VIS, and IR spectroscopy applications.

That is, spectrometer technology according to example embodiments can be made compact/portable and yet still with a high resolution and throughput. The technology according to example embodiments is similar to FTIR in terms of using a single-element (or single-pixel) detector instead of a detector array, hence it works well at IR spectrum where detector arrays are expensive and less sensitive. Similar to FTIR, it also has the multiplexing advantage hence high SNR in detection. Different from FTIR, it is not based on an optical interferometer, hence it is less sensitive to positioning errors and external disturbances, thereby facilitating miniaturization for field use and at the same time maintaining a satisfactory spectral resolution. Last not the least, the disclosed spectrometers according to example embodiments can also have relatively large entrance apertures therefore they have the ability to gather much more optical radiation energy even when compared with FTIR spectrometers.

Figure 5:
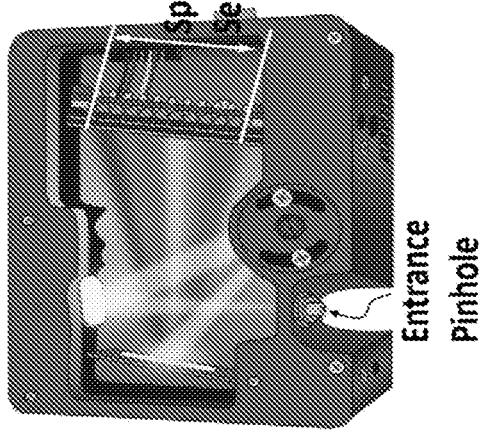
FIG. 5(a) illustrates an prior art encoding/decoding scheme for the spectrometer of FIG. 4(c).
FIG. 5(b) shows a prior art high-resolution Ocean optics' USB model VIS-NIR spectrometer.
FIG. 5(c) is a schematic drawing illustrating decoupling the throughput with the spectral resolution by encoding both the entrance slits and exit slits along a direction substantially transverse to the direction of dispersion according to an example embodiment.
Figure 5:
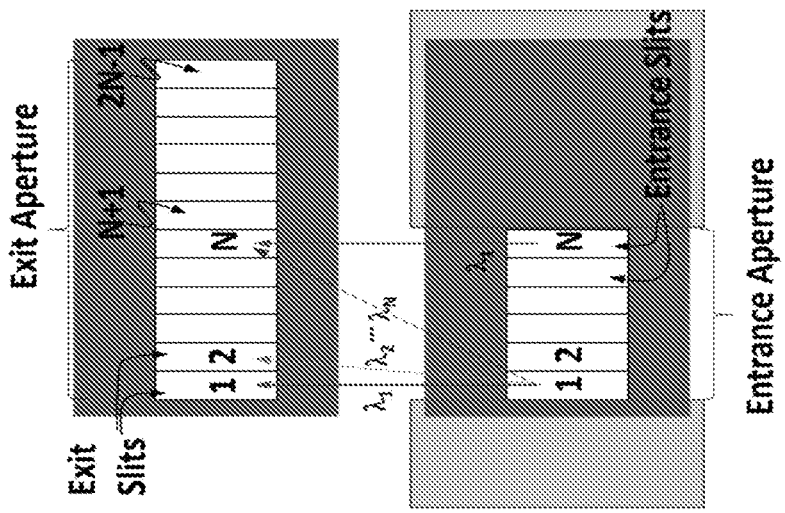
Figure 5:
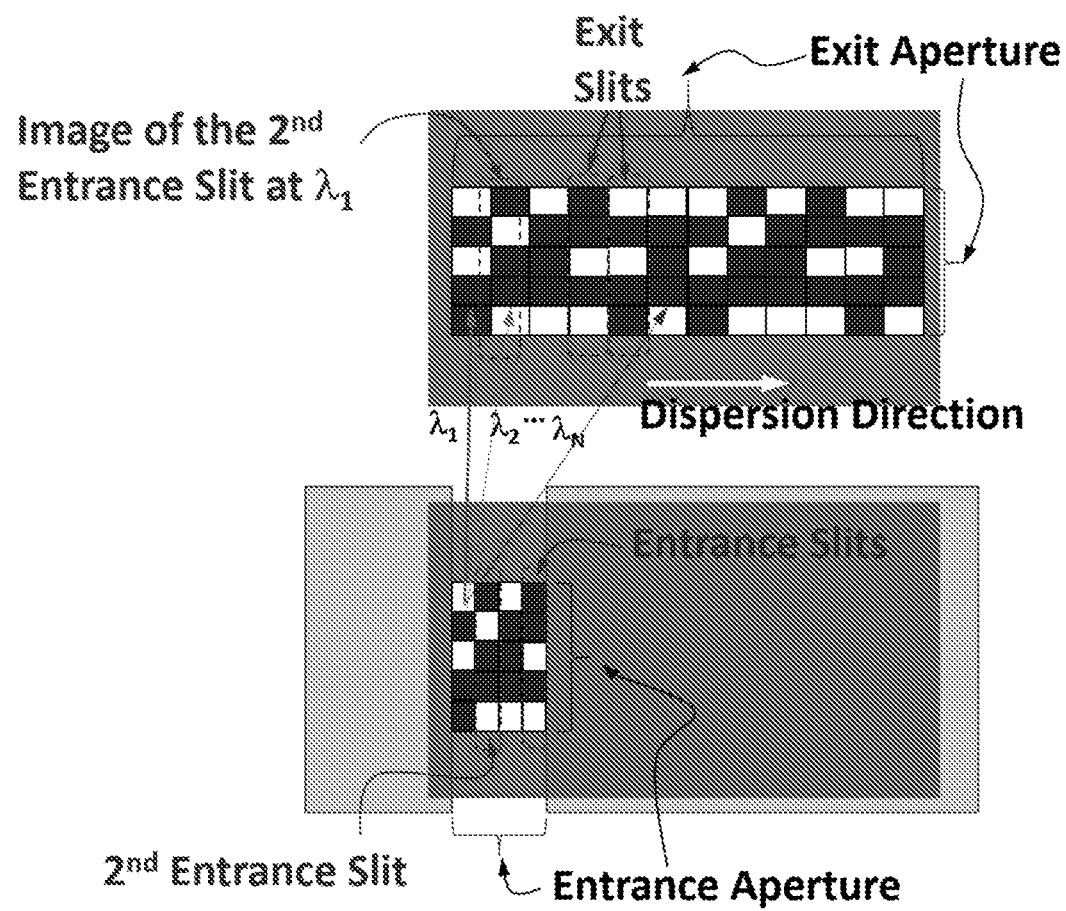

Also, in example embodiments of the present invention to decouple the throughput with the spectral resolution both the entrance slits and exit slits can be encoded along a direction substantially transverse to the direction of dispersion as illustrated in FIG. 5(c). With this design, one can freely choose any number of entrance slits in the entrance aperture. This is different from the spectrometer shown in FIG. 5(a), where the number of entrance slits has to be about half of the number of the exit slits. Additionally, the images of entrance slits need not be necessarily perfectly aligned to the exit slits according to example embodiments, as can be seen from one example highlighted in FIG. 5(c) with the $2^{nd}$ entrance slit and its image at the wavelength $\lambda_1$. This is also different from the spectrometer shown in FIG. 5(a). These unique features decouple the throughput with the spectral resolution according to example embodiments. Thus, one can now freely choose the size of the entrance aperture, and therefore achieving an optimal balanced design considering the spectral resolution, throughput, and the portable size.

Figure 6:
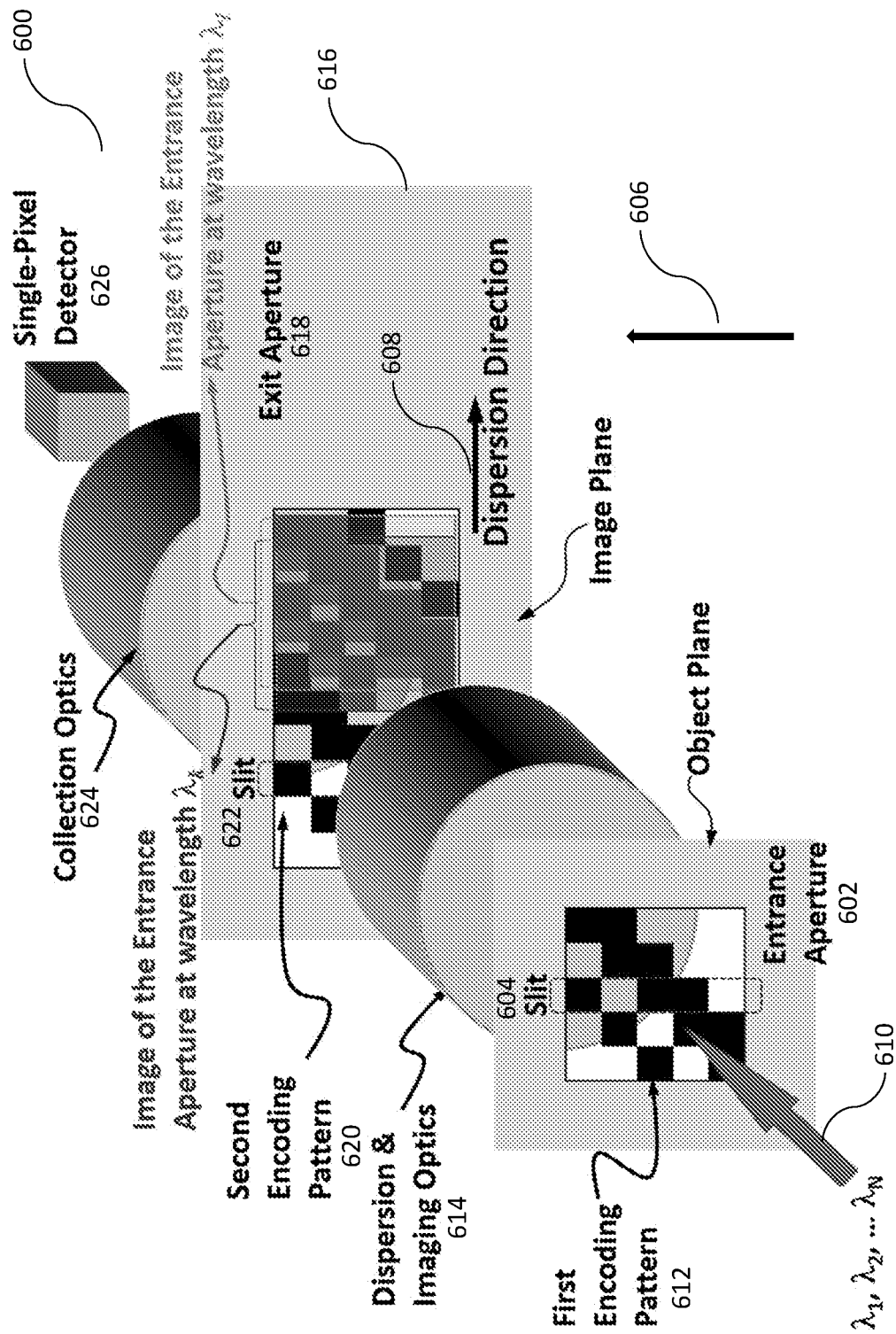
FIG. 6 shows a schematic drawing illustrating a spectrometer according to an example embodiment.

FIG. 6 shows a schematic drawing illustrating a spectrometer 600 according to an example embodiment of the invention. As shown, the entrance aperture 602 consists of at least one slit 604 that is encoded in a direction 606 substantially transverse to the direction 608 of dispersion of the spectrometer 600. The aperture 602 is uniformly illuminated with a light or EM wave source, indicated at numeral 610. The uniform illumination can be achieved in a number of ways, including using lenslet arrays, light homogenizers, and integration spheres. The light or EM wave passing through the entrance aperture 602 is then encoded for the first time with a first encoding pattern 612 (also called the first encoder), and then subsequently enters a dispersion and imaging optics 614. The dispersion and imaging optics 614 are similar or identical to those used in dispersive spectrometers, and could consist of mirrors/lenses for imaging and at least one dispersion element, e.g. gratings/prisms, for dispersion, as will be appreciated by a person skilled in the art. On the image plane 616 of the dispersion and imaging optics 614, an exit aperture 618 and a second encoding pattern 620 (also called the second encoder) is located that encode the light for a second time. The second encoder 620 consists of a plurality of slits e.g. 622, which in this embodiment together define the exit aperture 618, that are encoded in the direction 606 substantially transverse to the direction 608 of dispersion of the spectrometer 600. The total light attenuation or transmission is thus determined by the overlay of the images of the first encoding pattern 612 on the second encoding patterns 620. Unlike Golay's multi-slit spectrometers [5] and Grill spectrometers [6] that only allows a single wavelength component to pass and reach the detector and blocks the others, the spectrometer 600 according to an example embodiment allows multiple wavelength components to pass and reach the photodetector with slight or moderate attenuation and therefore has the multiplexing advantage to achieve enhanced SNR.

In this embodiment, the first encoding pattern 612 is adjustable or programmable and the second encoding pattern 620 is fixed. However, the first encoding pattern can be fixed while the second encoding pattern is adjustable, or both encoding patterns can be adjustable in different embodiments. The adjustable encoding pattern in various embodiments can be achieved in a number of ways, for example using a programmable micromirror array such as digital mirror device (DMD) from Texas Instruments (TI) [12] or simply a moving mask placed immediately behind a fixed aperture.

On the image plane 616 of the dispersion and imaging optics 614 as shown in FIG. 6, because of the dispersion, images of the encoded entrance aperture 612 at different wavelengths are located at different locations on the second encoding pattern along the direction 606 of dispersion as shown, and therefore, light intensities at different wavelengths are encoded differently by the, in this embodiment fixed, second encoding pattern 620 with designated weights thus allowing them to be successfully decoded using proper signal processing algorithms to reconstruct the light spectrum.

After the light passing through the exit aperture 618/the second encoding pattern 620, it is collected by a light collection optics 624 and concentrated/focused on a single-pixel light detector 626. The light collection optics 624 that matches the size of the exit aperture 618 to the size of the photosensitive area on photodetector 626 can be an imaging optics or a non-imaging optics such as a light concentrator, for example a compound parabolic concentrator (CPC) [13].

The basic operation principle of the spectrometer 600 according to the example embodiments is described as follows. As shown in FIG. 6, the incident light radiation 610 contains the N number of spectral components $\lambda_1, \lambda_2, \ldots, \lambda_k, \ldots \lambda_N$ (k=1~N) within a spectral band of interest [$\lambda_{min}, \lambda_{max}$] and illuminates the entrance aperture 602 uniformly. Light radiation at other wavelengths outside this spectral band of interest can be easily filtered out with optical filters and prevented from entering the entrance aperture 602 of the spectrometer 600 system, as will be appreciated by a person skilled in the art. The first encoding pattern 612 is adjustable, and is adjusted for M times for a complete encoding sequence according to an example embodiment. As shown in FIG. 6, the second encoding pattern 620 used in this example embodiment is fixed. Therefore, when the first encoding pattern 612 is set at the $j^{th}$ pattern (j=1~M), the total transmission of the $k^{th}$ spectral component through the system is $w_{jk}$ and similarly that of the $l^{th}$ spectral component through the system is $w_{jl}$, which can be determined by the overlay of the first and second encoding patterns. It should be noted that $w_{jk}$ should generally be different from $w_{jl}$, because of the dispersion of the system and therefore patterns overlay at different locations. The total radiation power that can be transmitted through and reach the single-pixel photodetector is thus a linear combination of all powers in its spectral components, thus the $j^{th}$ measured signal from the detector is:

$$y_j = c \sum_{k=1}^{N} w_{jk} x_k, \quad (3)$$

where $y_j$ is the measured detector signal for the $j^{th}$ encoding pattern, c is a system constant determined by for example detector sensitivity, and $x_k$ is the light intensity of the $k^{th}$ spectral component at the entrance aperture (i.e. the light spectrum to be determined). Next, the first encoding pattern is set at the $(j+1)^{th}$ pattern to repeat the process, until a complete set of M measurements are done. Alternatively, the above equations, for j=1~M, can be expressed in a matrix form (here, the constant c is dropped because only relative intensities are important for the light spectrum):

$$Y = WX, \quad (4)$$

where Y is the measure vector (M×1) containing signals from the photodetector 626, X is the vector (N×1) containing N spectral components, and W is the weighting matrix (M×N) that is determined by the encoding scheme used or the patterns 612, 620 used at the entrance and exit apertures. There are several ways to solve the above equation for the light spectrum X depending on the number of measurements recorded:

(a) if M=N, then $X = W^{-1}Y$, and $W^{-1}$ is the inverse matrix of W. It can be shown that the best way of the encoding pattern design should follow a Hadamard matrix for 1 and −1 weightages and a S-matrix for 0 and 1 weightages [9].

(b) if M<N (i.e. fewer measurements are made than the unknowns), the light spectrum X can be solved using compressive sensing algorithms [14], provided that the light spectrum has to be sparse in some bases.

(c) if M>N (i.e. more measurements are made than the unknowns), the light spectrum X may be obtained using a number of approaches including Moore-Penrose generalized inverse. [15]

In the following description, an approach with M=N is used according to a preferred embodiment, which means that the number of measurements is equal to the number of unknown spectral components in the light spectrum. The extension of the approaches to M≠N cases according to different embodiments will be appreciated by a person skilled in the art.

Figure 7:
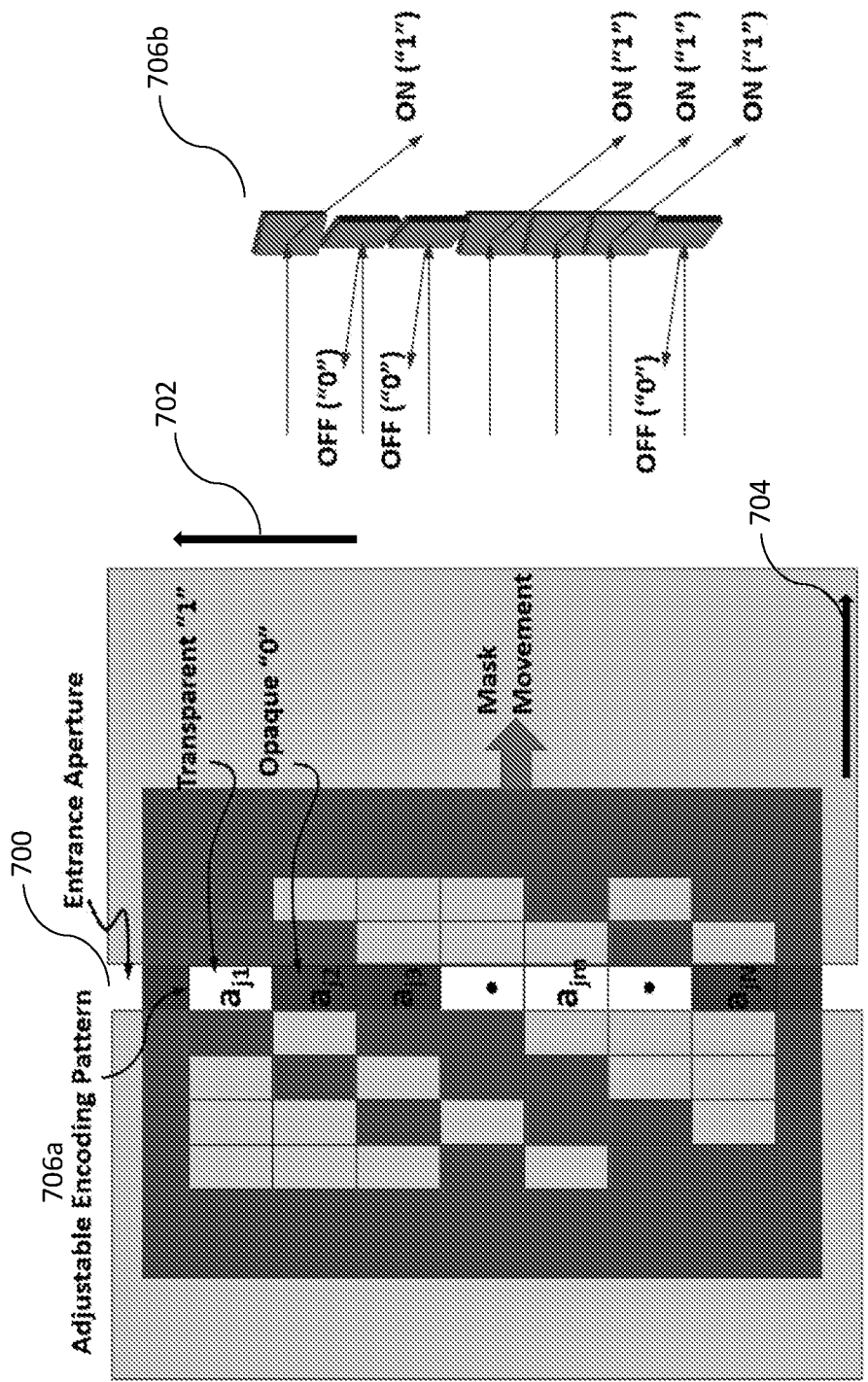
FIG. 7(a) shows a schematic drawing illustrating a movable mask placed immediately behind an entrance slit, according to an example embodiment.
FIG. 7(b) shows a schematic drawing illustrating a spatially encoded entrance slit implemented as a linear array of micromirrors, according to an example embodiment.

First, the case that the entrance aperture defines a single slit 700 as shown in FIG. 7 will be considered. This slit 700 is spatially encoded along its length direction 702 (or in other words, in a direction substantially transverse to the dispersion direction 704) by the first encoding pattern 706a, 706b. This encoding pattern 706a, 706b is adjustable and can be implemented in a number of ways. Two preferred ways are described in FIGS. 7(*a*) and (*b*), respectively, by way of example, not limitation.

As shown in FIG. 7(*a*), a movable mask 706a is placed immediately behind the slit 700, and the mask 706a contains pixels that are either transparent (allowing light to go through and enter the system and therefore the weightage of the pixel in the encoding pattern is "1") or opaque (blocking light to enter the system and therefore the weightage of the pixel in the encoding pattern is "0"). In FIG. 7(a) it is illustrated that the movement of the mask 706a is perpendicular to the slit length direction 702, and the mask 706a contains columns of different encoding patterns. When each column moves in the slit 700, it generates a new encoding pattern along the slit 700. It should be noted that the movement of the mask 706a can be along the slit length direction 702 as well. In this case, the mask pattern design shall be different compared with that shown in FIG. 7(a).

In the second preferred way to implement a spatially encoded slit as shown in FIG. 7(b), a linear array 706b of micromirrors is used. The slit is then formed by the micromirror array 706b itself, and each independently controlled micromirror represents a pixel. When a micromirror rotates to a designated orientation, it reflects the light into the spectrometer system and the pixel represented by this micromirror is then in a "ON" mode (therefore the weightage of the pixel in the encoding pattern is "1"). Alternatively, a micromirror can rotate to an "opposite" orientation, which directs the light "away" from the entrance of the spectrometer, and thus the pixel represented by this micromirror is then in a "OFF" mode (therefore the weightage of the pixel in the encoding pattern is "0").

Figure 8:
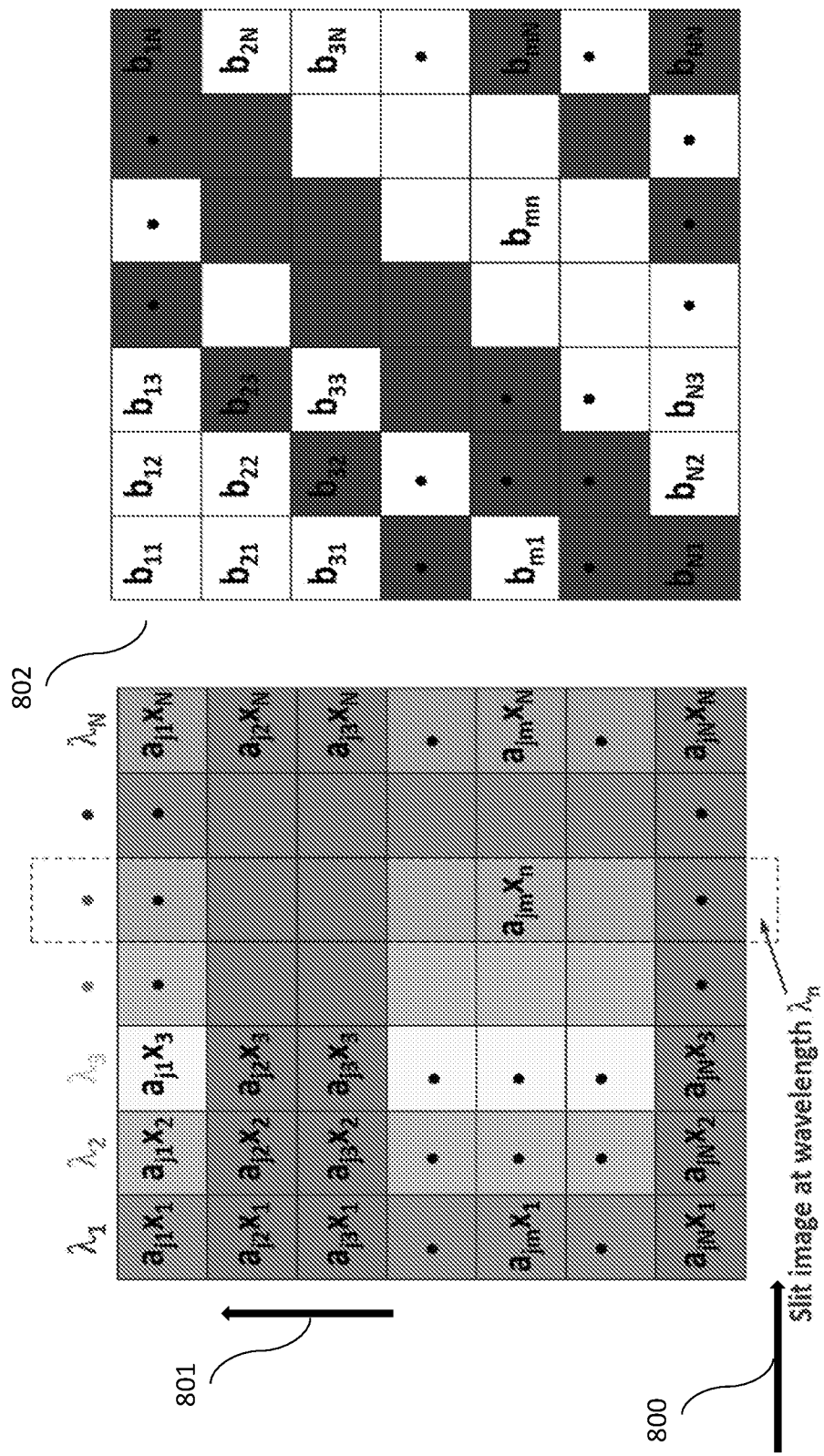
FIG. 8(a) shows a schematic drawing illustrating imaging of an encoded entrance slit by the dispersion and imaging optics, according to an example embodiment.
FIG. 8(b) shows a schematic drawing illustrating a second encoding pattern, according to an example embodiment.

Suppose that the first encoding pattern is set at the $j^{th}$ pattern (j=1~N), and $a_{jm}$ (m=1~N) denotes the weightage of the $m^{th}$ pixel (either transparent "1" or opaque "0") in this encoding pattern as shown in FIG. 7(a). This encoded slit shall be imaged by the dispersion and imaging optics to an image plane where the second encoding pattern is located. The corresponding slit images on this image plane are shown in FIG. 8(a) with different lighter gray scale colors indicating different wavelengths and the darkest grey color indicating dark spots due to the opaque pixels in the first encoding pattern. The light intensity at each spectral component is denoted as $x_n$ (n=1~N), which is to be measured to determine the light spectrum. It should be noted that the slit images at different wavelengths are located at different positions because of the dispersion optics involved with dispersion direction 800 perpendicular to the slit length direction 801. The second encoding pattern 802, as shown in FIG. 8(b), contains N×N encoding pixels and is aligned to the dispersed slit images. Here, we use $b_{mn}$ (m=1~N and n=1~N) to denote the weightage of the pixel with row number m and column number n in this second encoding pattern 802 as shown in FIG. 8(b). Again, $b_{mn}$ is either "1" or "0" if a binary mask is used corresponding to "transparent" or "opaque" condition of that pixel. It is also noted that this second encoding pattern 802 can also be viewed as a set of N slits arranged along the dispersion direction 800 with one immediately followed by the other with zero gap, also referred to as virtual slits herein, and each virtual slit is encoded in a direction 801 substantially transverse to the dispersion direction 800. It will be appreciated by a person skilled in the art that the second encoding pattern 802 comprising of N encoded slits arranged one after the other with a narrow, non-zero opaque gap in different embodiments will also work following the same principle. Preferably the gap is kept as small as possible, but there is no upper limit, although a large gap may degrade the performances. In practice, small gaps may be unavoidable in implementation, e.g. if the encoding pattern is implemented using a micromirror array in example embodiments, where the gap is in the form of the small space between adjacent mirrors that is unavoidable because of the limitations of microfabrication.

Evidently, the total transmission of the light power through the first and second encoder is then determined by the overlay of the encoded slit images and the second encoding pattern 802 shown in FIG. 8(b). The measured signal from the single-pixel detector, when the first encoding pattern is set at the $j^{th}$ pattern (j=1~N), is then:

$$y_j = \Sigma_{m=1}^N \Sigma_{n=1}^N a_{jm} x_n b_{mn} = \Sigma_{m=1}^N \Sigma_{n=1}^N a_{jm} b_{mn} x_n. \quad (5)$$

Next, the first encoding pattern is then set to the $(j+1)^{th}$ pattern until a complete set of N measurements is done. This process again results in a set of N linear equations with N unknowns, which can be conveniently expressed in a matrix form:

$$Y = ABX, \quad (6)$$

where Y is the measure vector (N×1) containing measured signals from the single-pixel detector, X is the vector (N×1) containing N spectral components, A and B are encoding matrices (both having a dimension of N×N) that are dependent respectively of the first and second encoding patterns.

The choice of the matrices A and B according to a preferred embodiment will now be described. Let $A = S_N$ and $B = S_N^T$, where $S_N$ is a cyclic S-Matrix of order N, and T denotes matrix transpose. The following characteristics of a cyclic S-matrix can be used to immediately reconstruct the light spectrum X, and also estimate the average mean square error in this reconstruction. One has [9]:

$$S_N S_N^T = (I_N + J_N)(N+1)/4, \quad (7)$$

$$(S_N S_N^T)^{-1} = 4I_N/(N+1) - 4J_N/(N+1)^2, \quad (8)$$

where $I_N$ is a N×N identity matrix and $J_N$ is a N×N matrix with all its elements equal to 1. The reconstruction of the light spectrum can be carried out using:

$$X = (S_N S_N^T)^{-1} Y = [4I_N/(N+1) - 4J_N/(N+1)^2] Y. \quad (9)$$

The average mean square error in this reconstruction can be estimated using [9]:

$$\varepsilon = (\sigma^2/N) \text{Trace}\{(S_N S_N^T S_N S_N^T)^{-1}\}, \quad (10)$$

where $\sigma^2$ is the variance of the noise in each measurement and trace{ } denotes the trace of a matrix, which is the sum of the entire diagonal elements. For a large number N, Trace $\{(S_N S_N^T S_N S_N^T)^{-1}\}$ is approximately equal to 16/N, which indicates that the average mean square error or noise in the reconstructed spectrum is indeed reduced to $\varepsilon = 16\sigma^2/N^2$ using the proposed approach with Eq. (9). Evidently, this reconstruction noise is much smaller than the error or noise $\sigma^2$ in the spectrum when it is chosen to measure the spectrum components individually one by one. This is in fact the multiplexing advantage according to this example embodiment, similar to a FTIR, which advantageously guarantees the enhanced SNR.

Figure 9:
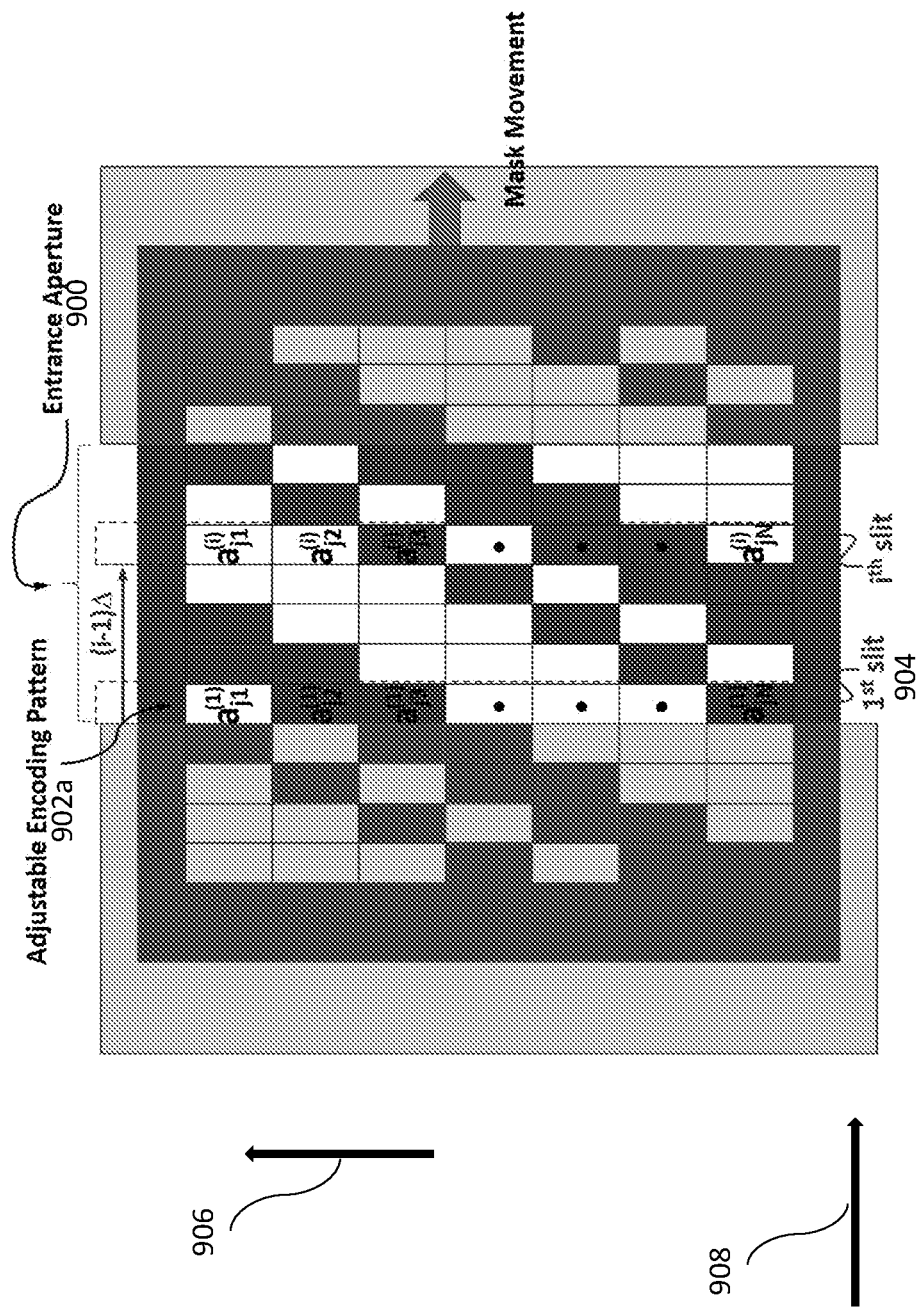
FIG. 9(a) shows a schematic drawing illustrating an entrance aperture having an extended area encoded with an adjustable 2D encoding pattern implemented a moveable mask, according to an example embodiment.
FIG. 9(b) shows a schematic drawing illustrating an adjustable 2D encoding pattern implemented as a 2D micromirror array, according to an example embodiment.
Figure 9:
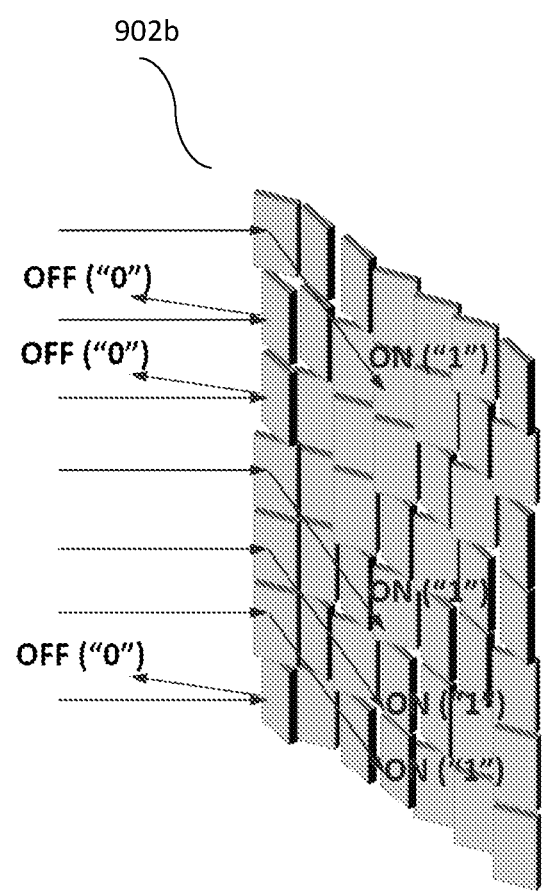

Next, the case where the entrance aperture 900 has an extended area as shown in FIG. 9(a) is considered. Similarly, this entrance aperture 900 is encoded with the first encoding pattern 902a, 902b as shown. Unlike the spectrometer system in which the entrance aperture covers a single (encoded) slit (shown in FIG. 7) that contains only a one-dimensional (1D) array of encoding pixels along the slit length, this first encoding pattern 902a, 902b now contains a two-dimensional (2D) array of encoding pixels and the entrance aperture 900 extends across a plurality of encoded slits e.g. 904. To model this system, one can imagine that the entrance aperture 900 is composed of multiple encoded slits e.g. 904 with the same width A that are placed one immediately beside the other with no gaps. It will be appreciated by a person skilled in the art that these encoded slits e.g. 904 arranged one after the other with a narrow, non-zero opaque gap in different embodiments will also work following the same principle. As mentioned above, encoded slits e.g. 904 with no gap are also be referred to as virtual slits herein. As shown in the figure, each slit e.g. 904 contains a column of encoding pixels. Or in other words, each slit e.g. 904 is encoded along a direction 906 substantially transverse to the direction 908 of dispersion.

Again, it is assumed that the 2D first encoding pattern 902a, 902b at this extended entrance aperture 900 is set at the $j^{th}$ pattern (j=1~N) and let $a_{jm}^{(i)}$ (m=1~N) denote the weightage of the encoding pattern of the $m^{th}$ pixel in the $i^{th}$ slit (or from the 2D array point of view, it is the weightage of the pixel with row number m and column number i) as shown in FIG. 9(a). Again, $a_{jm}^{(i)}$) is either "1" or "0" corresponding to respectively the transparent or opaque condition of the pixel. According to this example embodiment, this first encoding pattern 902a, 902b is adjustable, and the adjustable 2D encoding pattern can be conveniently implemented using a movable mask 902a placed immediately behind an entrance aperture 900 as shown in FIG. 9(a) or a 2D micromirror array 902b (such as TI's DMD) as shown in FIG. 9(b).

Figure 10:
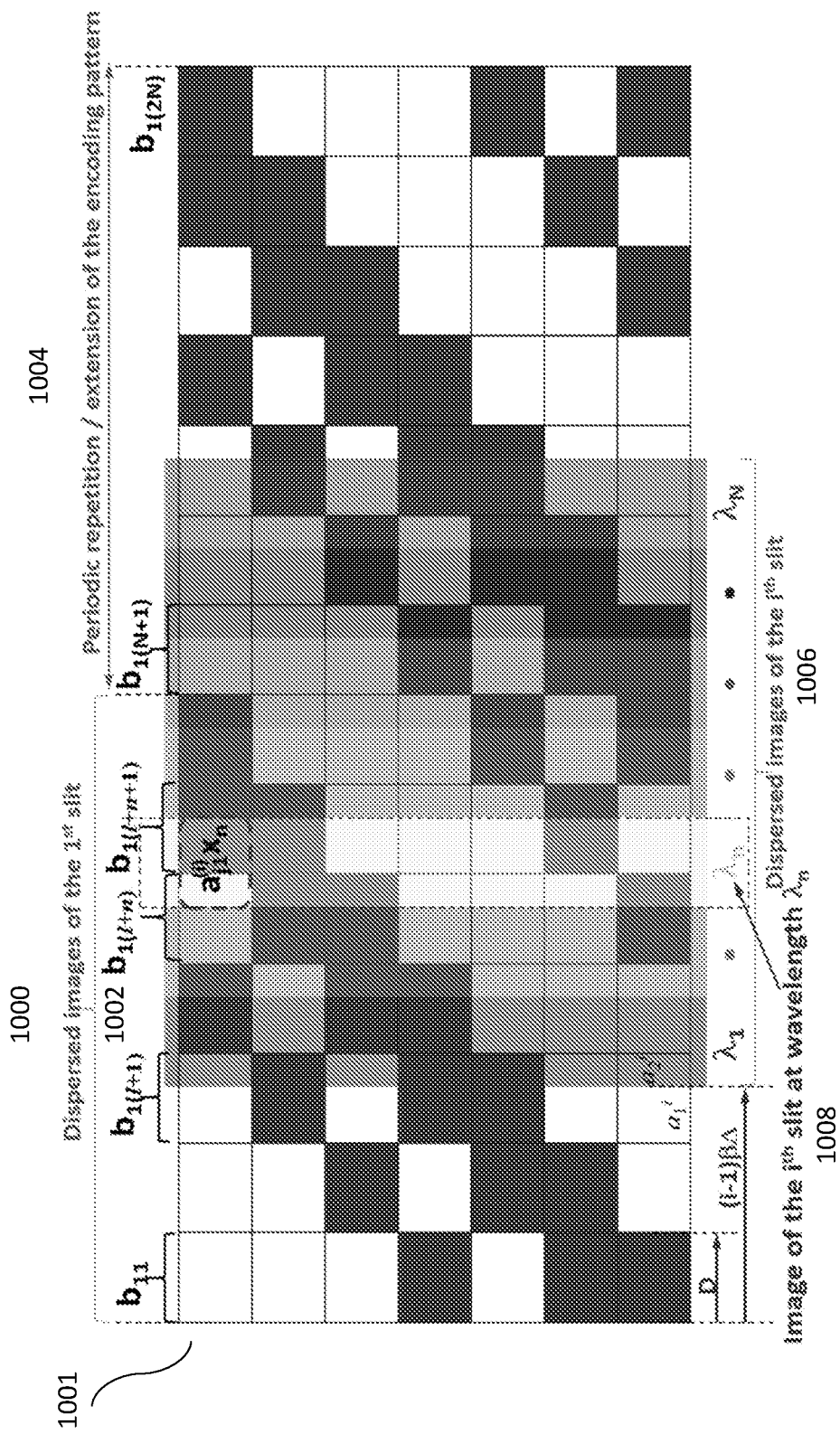
FIG. 10 shows a schematic drawing illustrating the beginning portion of the second encoding pattern being aligned with the dispersed image the $1^{st}$ to encode the light coming through the $1^{st}$ slit, according to an example embodiment.

The encoded entrance aperture is then imaged by the dispersion and imaging optics to its image plane where the second encoding pattern is located. Because the entrance aperture now contains multiple encoded slits, the second encoding pattern is then slightly different from the encoding pattern shown in FIG. 8(b) for the case where the entrance aperture has only a single slit. As illustrated in FIG. 10, the beginning portion 1000 of the second encoding pattern 1001 $b_{mn}$ (m=1~N and n=1~N) is aligned with the dispersed image 1002 of the $1^{st}$ slit to encode the light coming through the $1^{st}$ slit. The rest of the second encoding pattern 1004 is then periodically repeated as shown in FIG. 10. In other words, $b_{m(n+N)}=b_{mn}$. Here, the weightage $b_{mn}$ in the encoding pattern is either "1" or "0" corresponding respectively to the transparent or opaque condition of that pixel with row number m and column number n on the second encoding mask.

Without loss of generality, let one consider the $i^{th}$ encoded slit in this entrance aperture as indicated in FIG. 9(a). It is spatially shifted by a distance (i−1)Δ to the right relative to the $1^{st}$ slit, where Δ is simply the width of the slit. The dispersed image 1006 of this $i^{th}$ slit on the second encoding pattern at each wavelength is then also displaced with respective to the image of the $1^{st}$ slit at the same wavelength by a distance (i−1)βΔ, where β is the optical magnification of the dispersion and imaging optics. The dispersed image 1006 of the $i^{th}$ slit is plotted schematically in FIG. 10, with different grayscale colors indicating its spectral components from $\lambda_1$ to $\lambda_N$. Evidently, because of the shift, it is not guaranteed that the dispersed image of the $i^{th}$ slit at each spectral component is aligned with the encoding pixels on the second encoder pattern 1001. This can be seen by the highlighted $i^{th}$ slit image 1008 at wavelength $\lambda_n$ in FIG. 10, where the slit image 1008 is in fact encoded by two adjacent columns of the encoding pattern 1001 on the second encoder with each contributing a portion.

As was stated before, the entrance aperture is uniformly illuminated according to the example embodiments and the intensity of the light spectral component is $x_n$ for wavelength $\lambda_n$. To model the percentage of the light power incident on this $i^{th}$ slit that can be transmitted through the first and second encoder and reach the single-pixel photodetector, an integer l is defined as follows:

$$l=\text{floor}\{(i-1)\beta\Delta/D\}, \tag{11}$$

where the function floor{x} rounds the object x to the nearest integer in the direction of negative infinity and D is the pixel width in the second encoding pattern. The total power incident on the $i^{th}$ slit that can be transmitted through is then:

$$P_j^i = c\{\alpha_2^i \Sigma_{m=1}^N \Sigma_{n=1}^N a_{jm}^{(i)} b_{m(l+n)} x_n + \alpha_1^i \Sigma_{m=1}^N \Sigma_{n=1}^N a_{jm}^{(i)} b_{m(l+n+1)} x_n\}, \tag{12}$$

where i denotes the $i^{th}$ slit, j represents the condition that the first encoder is set at the $j^{th}$ pattern, c is a constant related to the area of the encoding pixels as well as the losses in the optical system, and $\alpha_1^i$ and $\alpha_2^i$ are the two coefficients representing the percentage contributions from the two adjacent encoding columns. $\alpha_1^i$ and $\alpha_2^i$ can be estimated as follows:

$$\alpha_1^i = \frac{(i-1)\beta\Delta - lD}{D}, \tag{13}$$

$$\alpha_2^i = \frac{(l+1)D - (i-1)\beta\Delta}{D}. \tag{14}$$

The light power $P_j^i$ reaching the single-pixel detector results in a signal, $$y_j^i = \eta P_j^i = \eta c\{\alpha_2^i \Sigma_{m=1}^N \Sigma_{n=1}^N a_{jm}^{(i)} b_{m(l+n)} x_n + \alpha_1^i \Sigma_{m=1}^N \Sigma_{n=1}^N a_{jm}^{(i)} b_{m(l+n+1)} x_n\}, \tag{15}$$

where η is the sensitivity of the photodetector. In the above equation (15), the assumption that $r_i$ is independent of wavelength is made. This assumption however does not lose any generality, because the spectral dependent sensitivity of a photodetector can always be calibrated and subsequently removed using a light source with a known spectrum. Since the application we consider here is spectroscopy, the relative values of $x_n$ is important whereas their absolute values are not. Therefore, the constants $\eta_c$ in Eq. (15) can be dropped resulting in a simpler form:

$$y_j^i = \alpha_2^i \Sigma_{m=1}^N \Sigma_{n=1}^N a_{jm}^{(i)} b_{m(l+n)} x_n + \alpha_1^i \Sigma_{m=1}^N \Sigma_{n=1}^N a_{jm}^{(i)} b_{m(l+n+1)} x_n. \tag{16}$$

When a full set of N measurements are completed (i.e. the first encoding pattern has adjusted for N times from j=1 to j=N), the above linear equations can be expressed in a matrix form as:

$$Y^i = \alpha_2^i A^{(i)}(BR^l)X + \alpha_1^i A^{(i)}(BR^{l+1})X, \tag{17}$$

where $Y^i$ is the vector containing the measured signals that are contributed from the $i^{th}$ slit, X is the vector containing the light spectrum, $A^{(i)}$ and B are encoding matrices that are dependent respectively of the first and second encoding patterns, and R is the shift matrix defined as follows:

$$R = \begin{bmatrix} 0 & 0 & 0 & . & 1 \\ 1 & 0 & 0 & . & 0 \\ 0 & 1 & 0 & . & 0 \\ . & . & . & . & . \\ 0 & 0 & . & 1 & 0 \end{bmatrix}. \tag{18}$$

$R^l$=RRR ... R, i.e. matrix multiplication by/times. Eq. (17) is obtained based on the facts that (i) the periodicity of the second encoder, i.e. $b_{m(n+N)}=b_{mn}$ and (ii) the properties of the shift matrix that:

$$R^l = \begin{bmatrix} 0 & 0 & . & 1 & 0 & 0 \\ . & . & . & . & . & . \\ 0 & 0 & . & 0 & 0 & 1 \\ 1 & 0 & . & 0 & 0 & 0 \\ . & . & . & . & . & . \\ 0 & 0 & 1 & 0 & 0 & 0 \end{bmatrix} \quad (19)$$

$l^{th}$ row and $BR^l = \begin{bmatrix} b_{1(l+1)} & . & b_{1N} & b_{11} & . & b_{1l} \\ b_{2(l+1)} & . & b_{2N} & b_{21} & . & b_{2l} \\ b_{3(l+1)} & . & b_{3N} & b_{31} & . & b_{3l} \\ . & . & . & . & . & . \\ b_{N(l+1)} & . & b_{NN} & b_{N1} & . & b_{Nl} \end{bmatrix}.$ Again, one can design the first and second encoding pattern such that the matrix $A_{(i)}$ and B are circulant, according to example embodiments. Then, according to characteristics of circulant matrices, AB is also a circulant matrix. Utilizing the properties of circulant and shift matrices, we can easily obtain that $(A_{(i)}B)R^l = R^l(A^{(i)}B)$, therefore, Eq. (17) can be rewritten as:

$$Y^i = \alpha_2^i R^l A^{(i)} BX + \alpha_1^i R^{l+1} A^{(i)} BX. \quad (20)$$

Considering the fact that the entrance aperture contains multiple encoded slit, the overall signal output from the single-pixel detector Z is then:

$$Z = \Sigma_i Y^i. \quad (21)$$

The light spectrum can then be reconstructed from Eq. (21). Before the details of this spectrum reconstruction are discussed, the throughput and spectrum resolution trade-off in existing grating-based dispersive spectrometer systems will be considered and to facilitate understanding how the approach according to example embodiments can successfully overcome this trade-off limitation.

Figure 11:
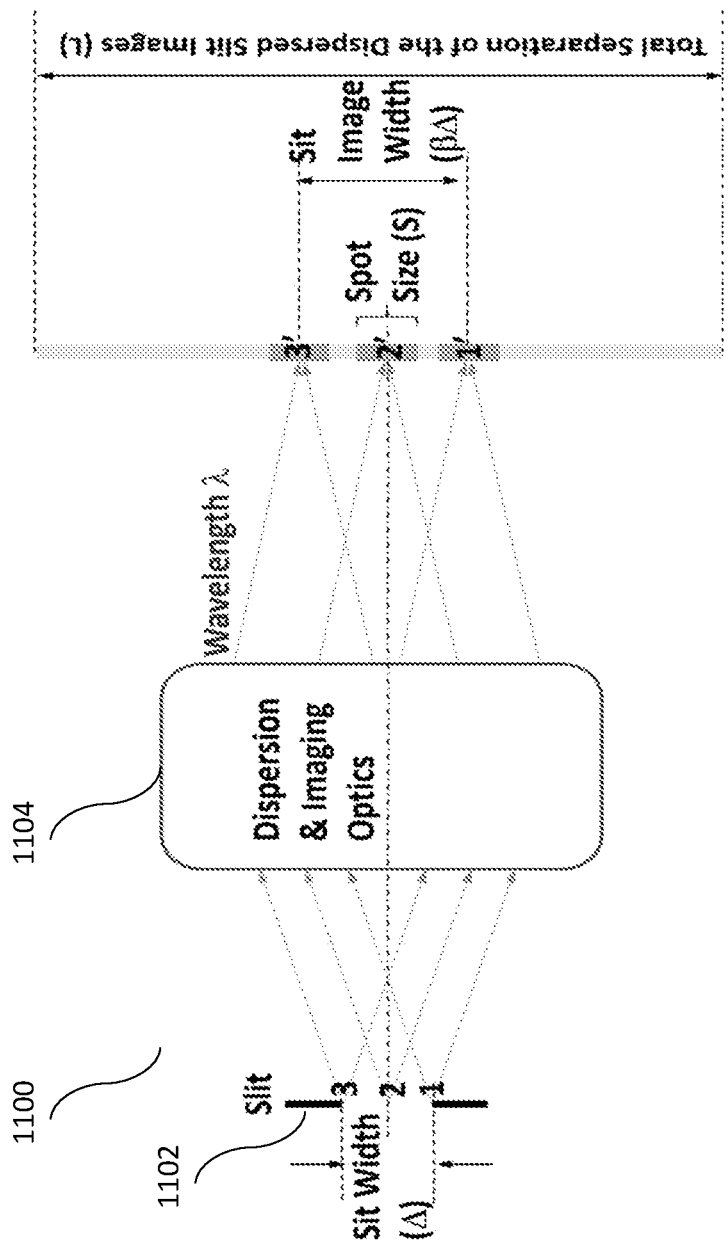
FIG. 11(a) shows a prior art dispersive spectrometer with the slit image at wavelength X is larger than the spot size S, resulting in the spectral resolution being mainly determined by the slit width.
FIG. 11(b) shows a prior art dispersive spectrometer with the slit image being much smaller than the spot size on its focal plane, resulting in the spectral resolution being mainly determined by the spot size.
Figure 11:
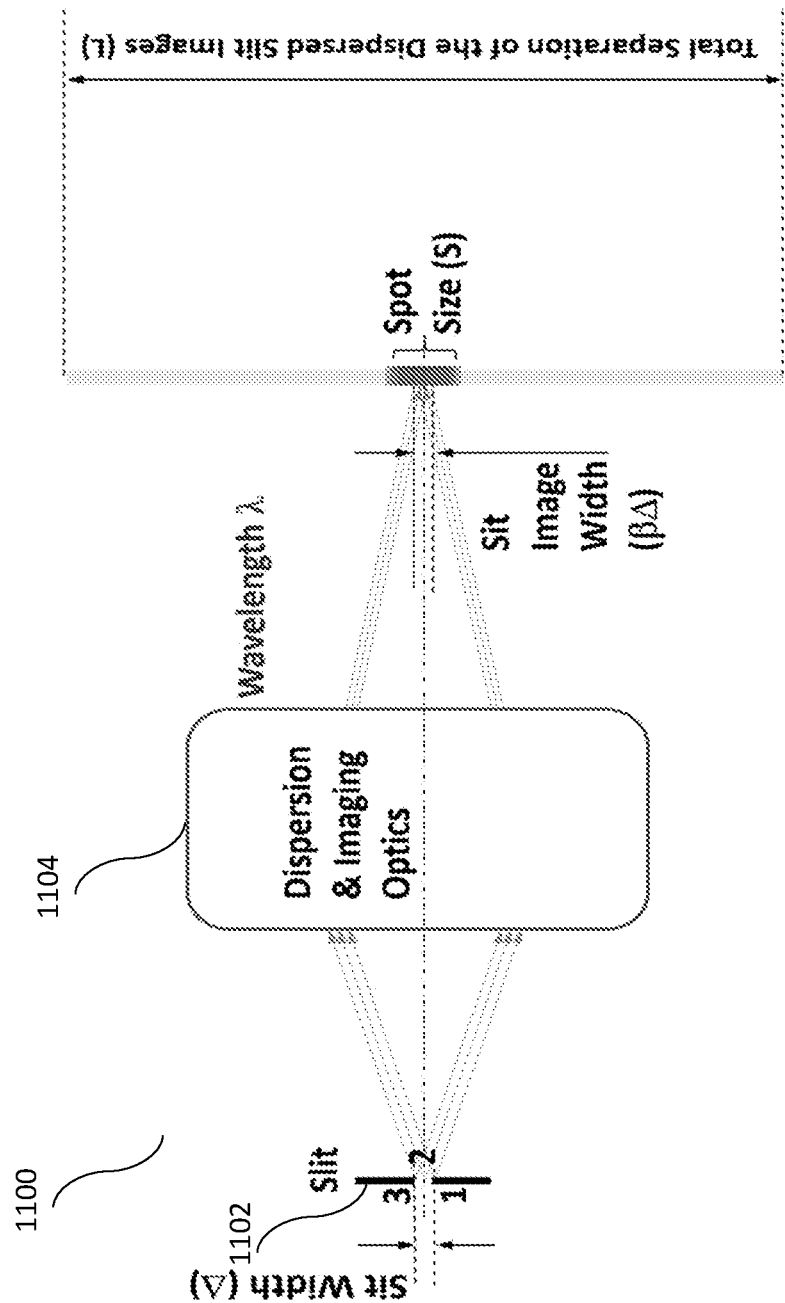

A typical existing dispersive spectrometer 1100 is schematically illustrated in FIG. 11. As shown, three points 1, 2, and 3 in an entrance slit 1102 (with point 2 at the center and points 1 & 3 at the edge) are dispersed and imaged by a dispersion and imaging optics 1104 to its focal plane. At wavelength $\lambda$, the images of these three points are respectively 1', 2', and 3'. The total separation distance of the dispersed slit images within the spectral band of interest from wavelength $\lambda_1$ to $\lambda_N$ is L. This separation distance L is measured along the direction of dispersion. As shown in FIG. 11, because of the diffraction and aberrations in the optics 1104, the focused light has a finite spot size S. As shown in FIG. 11(*a*), if the slit image at wavelength $\lambda$ (i.e. $\beta\Delta$, with $\beta$ being the optical magnification and A being the slit width) is larger than the spot size S, then the spectral resolution is mainly determined by the slit width and total number of resolvable spectral components is roughly equal to L/$\beta\Delta$). As shown in FIG. 11(*b*), if the slit image instead is much smaller than the spot size on its focal plane, then the spectral resolution is mainly determined by the spot size and total number of resolvable spectral components is roughly equal to L/S. From FIG. 11, one can clearly see that a smaller slit width is desirable for achieving a larger number of resolvable spectral components in the obtained spectrum (or in other words better spectral resolution of the spectrometer), however, a smaller slit width also limits the amount of light that can be collected (i.e. throughput) thus resulting in lower SNR. This represents the typical throughput and spectrum resolution trade-off in conventional dispersive spectrometers.

Advantageously, the above-mentioned trade-off however does not exist in embodiments of the present invention, because the entrance aperture can contain multiple encoded slits. In the spectrometer system according to example embodiments, the image width of a single slit ($\beta\Delta$) can be chosen to be smaller than the spot size such that it does not affect the spectral resolution and the number of resolvable spectral components is thus equal to L/S and consequently the spectrometer can be made to achieve high spectral resolution. The throughput of the spectrometer system is, however, determined by the total area of the entrance aperture and not by the area of a single slit. And because embodiments of the present invention can have a number of slits in the entrance aperture, the throughput of the spectrometer according to example embodiments can also still be high despite the fact that the spectrometer according to example embodiments is designed to have a high spectral resolution.

Below one of the possible designs of encoding patterns according to example embodiments is described to validate that the light spectrum can be readily reconstructed using Eq. (21). It should be noted that the present invention is not limited to those examples and there are many possible designs of the encoding patterns that can achieve the same goal of reconstructing the spectrum with Eq. (21) in various other example embodiments, as will be appreciated by a person skilled in the art.

In one example design, let the matrix $A^{(i)}$ in Eq. (20) be the same for all i, or $A^{(i)} = A$, which means that all slits in the entrance aperture are all encoded with the same pattern. Then, the Eq. (20) becomes, $$Y^i = \beta_2^i R^l ABX + \alpha_1^i R^{l+1} ABX, \quad (22)$$

Figure 12:
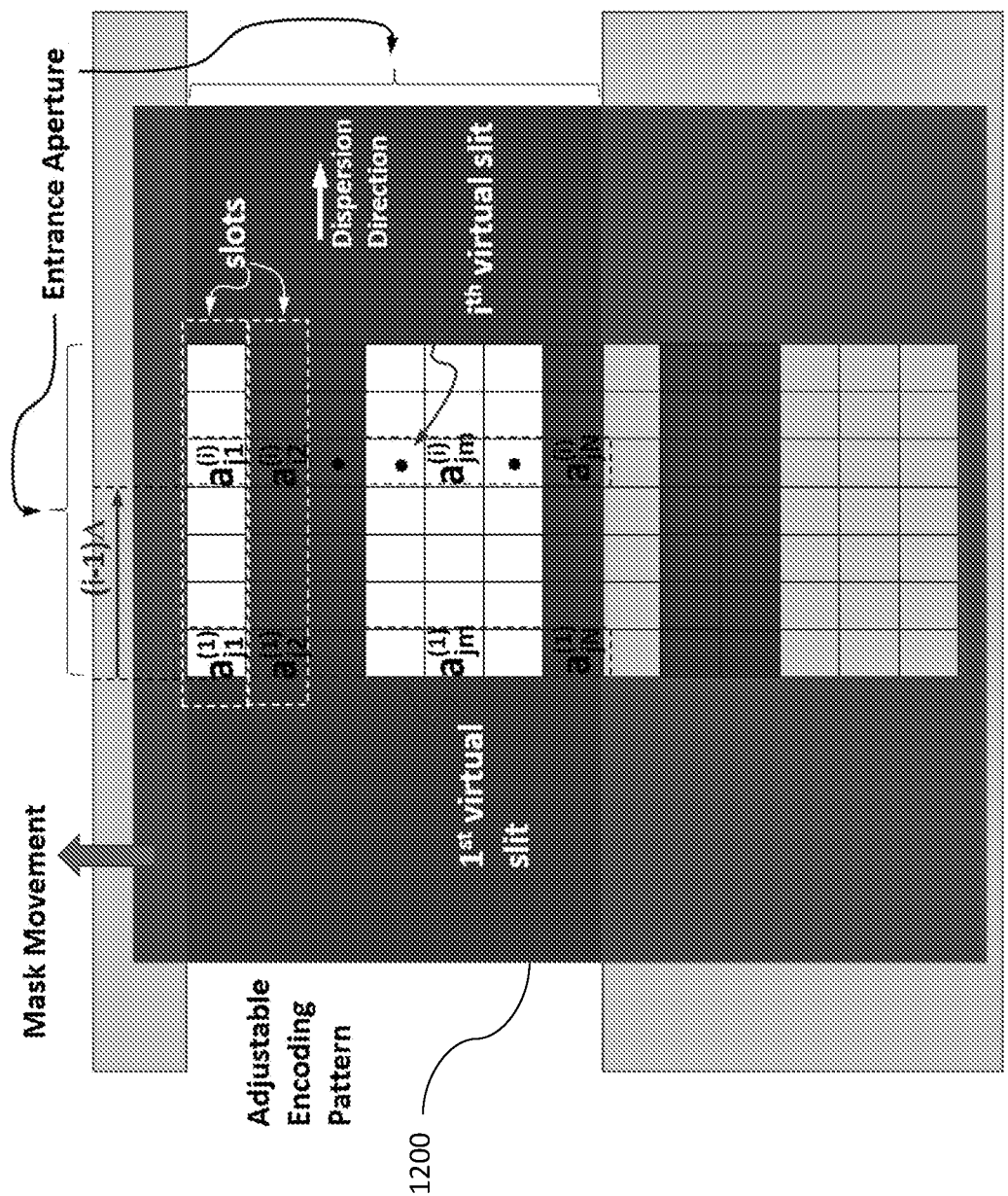
FIG. 12 shows a schematic drawing illustrating an adjustable encoder for the entrance aperture implemented using a movable mask in combination with a fixed aperture opening, according to an example embodiment.

Furthermore, let $A = S_N$, where $S_N$ is a cyclic S-Matrix of order N. In other words, all entrance slits are adjusted in the same way according to the same cyclic S-Matrix. This adjustable encoder for the entrance aperture according to the example embodiment can be readily implemented using, for example, either a MEMS micromirror array or a movable mask in combination with a fixed aperture opening, the latter of which is illustrated schematically in FIG. 12. As shown, the mask 1200 consists of a set of open and closed slots whose length direction is arranged parallel to the dispersion direction of the instrument. The movement of the mask 1200 is perpendicular to the dispersion direction as shown. In this way, when the mask 1200 moves a predefined amount, for example a step equal to the width of the slot, the encoding pattern changes to a new one. Following the above described modelling approach, one can treat this encoder as if it consists of many tiny virtual slits placed one immediately beside the other with no gaps as shown in FIG. 12. Evidently, this design according to an example embodiment fulfils that the encoding matrix $A^{(i)}$ is the same for all slits (i=1, 2, . . . ). In the exit aperture plane, let the second encoder's fixed encoding pattern follow a design such that the encoding matrix $B = S_N^T$, where T denotes matrix transpose.

Figure 13:
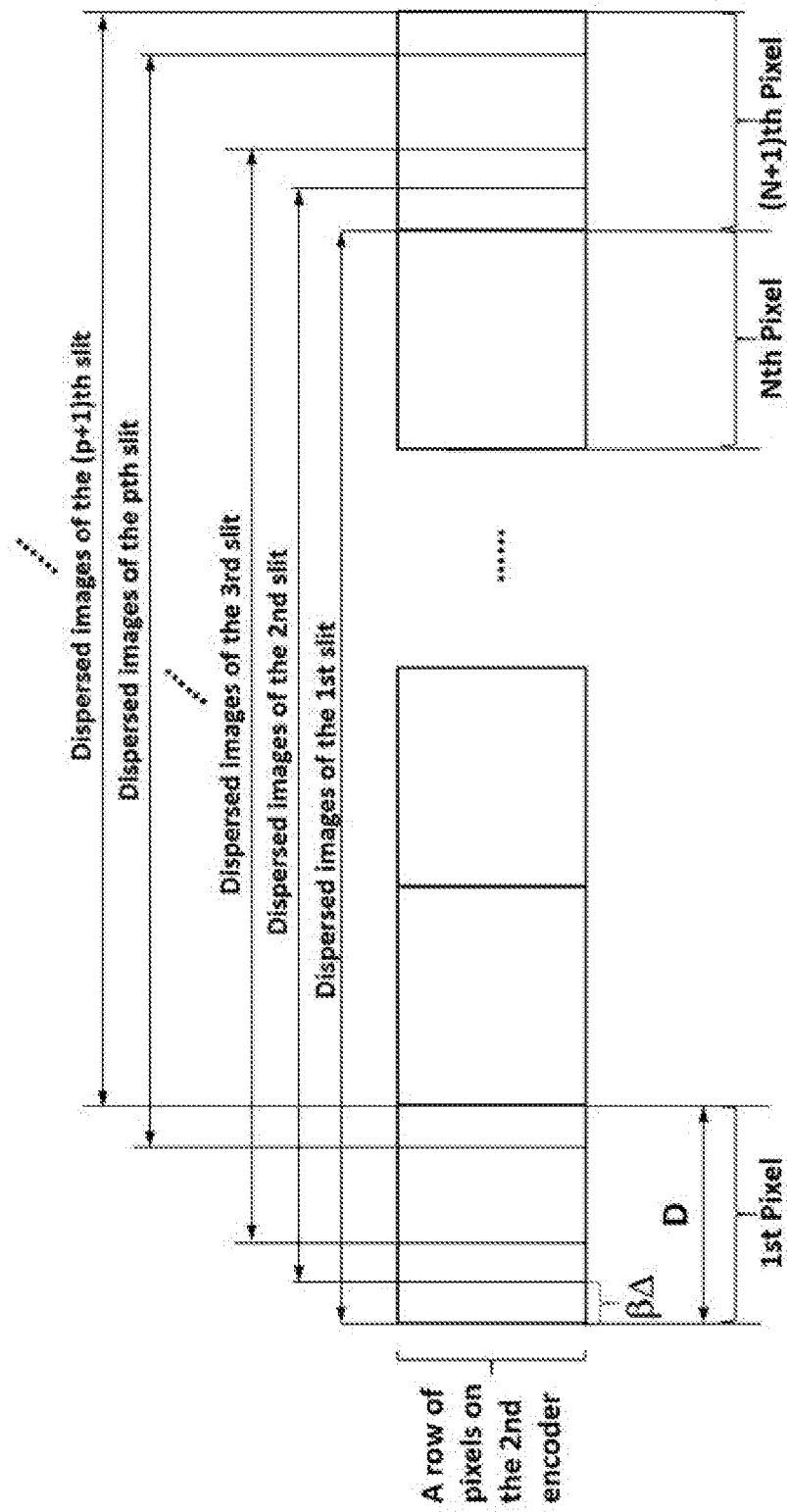
FIG. 13 shows a schematic drawing illustrating a typical row of the second encoding pattern, according to an example embodiment.

FIG. 13 further shows schematically a typical row of the second encoding pattern where D denotes the width of an encoding pixel. As shown in FIG. 13, the dispersed image of the P$^r$ slit in the entrance aperture spans a first portion on the second encoder that contains N pixels from the 1$^{st}$ to N$^{th}$ pixel. Subsequent portions of the second encoder from (N+1)$^{th}$ pixel onward are simply the periodic repetition of the first portion. From this, one can see that a preferred choice of pixel width D is to let it be equal to the spot size. Because, if D is larger than the spot size then the resolution of the spectrometer can still be enhanced by reducing D. And if D is equal to or smaller than the spot size then reducing the value of D does not further enhance the spectral resolution. The spot size affected by the diffraction limit (Airy spot size) and the aberrations presented in the optical system shall ultimately determine the spectral resolution of the spectrometer according to example embodiments. In the case presented in FIG. 13, the number of resolvable spectral components is then equal to N.

As was pointed out before, the entrance aperture according to example embodiments contains a number of narrow virtual slits, each having a small width of $\Delta$. At the exit aperture plane, the dispersed image of one slit at each wavelength is thus shifted by a distance of $\beta\Delta$ from that of its neighboring one at the same wavelength along the direction of dispersion. $\beta\Delta$ is much smaller than the pixel size D in example embodiments, as shown. In fact, one can treat the design according to example embodiments such that $D/(\beta\Delta)$ is an integer p, i.e. $p=D/(\beta\Delta)$, and the integer p is larger than 1. Then, the relative positions of the images of the $1^{st}$, $2^{nd}$, and $3^{rd}$ virtual slits and so on at the second encoder plane are illustrated in FIG. 13. Using Eqs. (13), (14), and (22), one can determine the signal contributed from each slit as follows.

For the $1^{st}$ slit, i=1, l=0, $\alpha_1^1=0$, $\alpha_2^1=1$, and, $$Y^1 = R^0 ABX, \quad (23)$$

where $R^0$ is equal to the identity matrix I. For the $2^{nd}$ slit, i=2, l=0, $\alpha_1^2=1/p$, $\alpha_2^2=(p-1)/p$, and, $$Y^2 = \frac{p-1}{p} R^0 ABX + \frac{1}{p} R^1 ABX. \quad (24)$$

Similarly, for the $3^{rd}$ slit, i=3, l=0, $\alpha_1^3=2/p$, $\alpha_2^3=(p-2)/p$, and, $$Y^3 = \frac{p-2}{p} R^0 ABX + \frac{2}{p} R^1 ABX. \quad (25)$$

Continuing this way, for the $p^{th}$ slit, i=p, l=0, $\alpha_1^{p}=(p-1)/p$, $\alpha_2^p=1/p$, and $$Y^p = \frac{1}{p} R^0 ABX + \frac{p-1}{p} R^1 ABX. \quad (26)$$

Then, for the next $(p+1)^{th}$ slit, i=p+1, l=1, $\alpha_1^{p+1}=1$, and, $$Y^{p+1} = R^1 ABX. \quad (27)$$

For the $(p+2)^{th}$ slit, i=p+2, l=1, $\alpha_1^{p+2}=1/p$, $\alpha_2^{p+2}=(p-1)/p$, and, $$Y^{p+2} = \frac{p-1}{p} R^1 ABX + \frac{1}{p} R^2 ABX. \quad (28)$$

Following this pattern, it can be readily seen that if there is a total number of (pq+1) slits, where q is also an integer and q>1, then an overall signal Z from the single-pixel detector that is a summation of all signals contributed from all the slits. And, Z can be written as follows, $$Z = \sum_{i=1}^{pq+1} Y^i = \left(1 + \frac{p-1}{p} + \ldots + \frac{1}{p}\right) R^0 ABX + \quad (29)$$
$$\left(1 + \frac{2(p-1)}{p} + \ldots + \frac{2}{p}\right) R^1 ABX + \ldots \left(1 + \frac{p-1}{p} + \ldots + \frac{1}{p}\right) R^q ABX.$$

Simplifying the above, one can have, $$Z = \left(\frac{p+1}{2}\right) R^0 ABX + (p) R^1 ABX + (p) R^2 ABX + \ldots \left(\frac{p+1}{2}\right) R^q ABX \quad (30)$$

Since p>>1, we further have the following approximation, $$Z = \left(\frac{p}{2}\right) R^0 ABX + (p) R^1 ABX + (p) R^2 ABX + \ldots \left(\frac{p}{2}\right) R^q ABX \quad (31)$$

Consider the fact that spectrum vector X concerns about the relative intensity, the number p that is wavelength independent can be dropped, resulting in, $$Z = \left(\frac{1}{2}\right) R^0 ABX + R^1 ABX + R^2 ABX + \ldots \left(\frac{1}{2}\right) R^q ABX \quad (32)$$

Defining the following circulant matrix C, $$C = \begin{bmatrix} c_1 & c_2 & c_3 & . & . & c_{N-2} & c_{N-1} & c_N \\ c_N & c_1 & c_2 & c_3 & . & . & c_{N-2} & c_{N-1} \\ c_{N-1} & c_N & c_1 & c_2 & c_3 & . & . & c_{N-2} \\ . & . & . & . & . & . & . & . \\ . & . & . & . & . & . & . & . \\ . & . & c_{N-2} & c_{N-1} & c_N & c_1 & c_2 & c_3 \\ c_3 & . & . & c_{N-2} & c_{N-1} & c_N & c_1 & c_2 \\ c_2 & c_3 & . & . & c_{N-2} & c_{N-1} & c_N & c_1 \end{bmatrix} \quad (33)$$

where the first row of C is determined by, $$c_i = \begin{cases} 1/2 & i = 1 \\ 0 & i = 2 \sim (N-q) \\ 1/2 & i = (N-q+1) \\ 1 & i = (N-q+2) \sim N \end{cases} \quad (34)$$

Then, the Eq. (32) can be then rewrite to the following form, where the matrix $A=S^N$ and $B=S_N^T$ have also been taken into consideration, $$Z = CABX = CS_N S_N^T X. \quad (35)$$

Since C is a circulant matrix, it is generally not singular if N is an odd number which is usually the case for cyclic S matrices. Then C is invertible, and $C^{-1}$ can be readily computed using the method provided in ref [16]. Evidently, the light spectrum X can be conveniently calculated from the above equation, $$X = (S_N S_N^T)^{-1} C^{-1} Z = [4I_N/(N+1) - 4J_N/(N+1)^2] C^{-1} Z. \quad (36)$$

Figure 14:
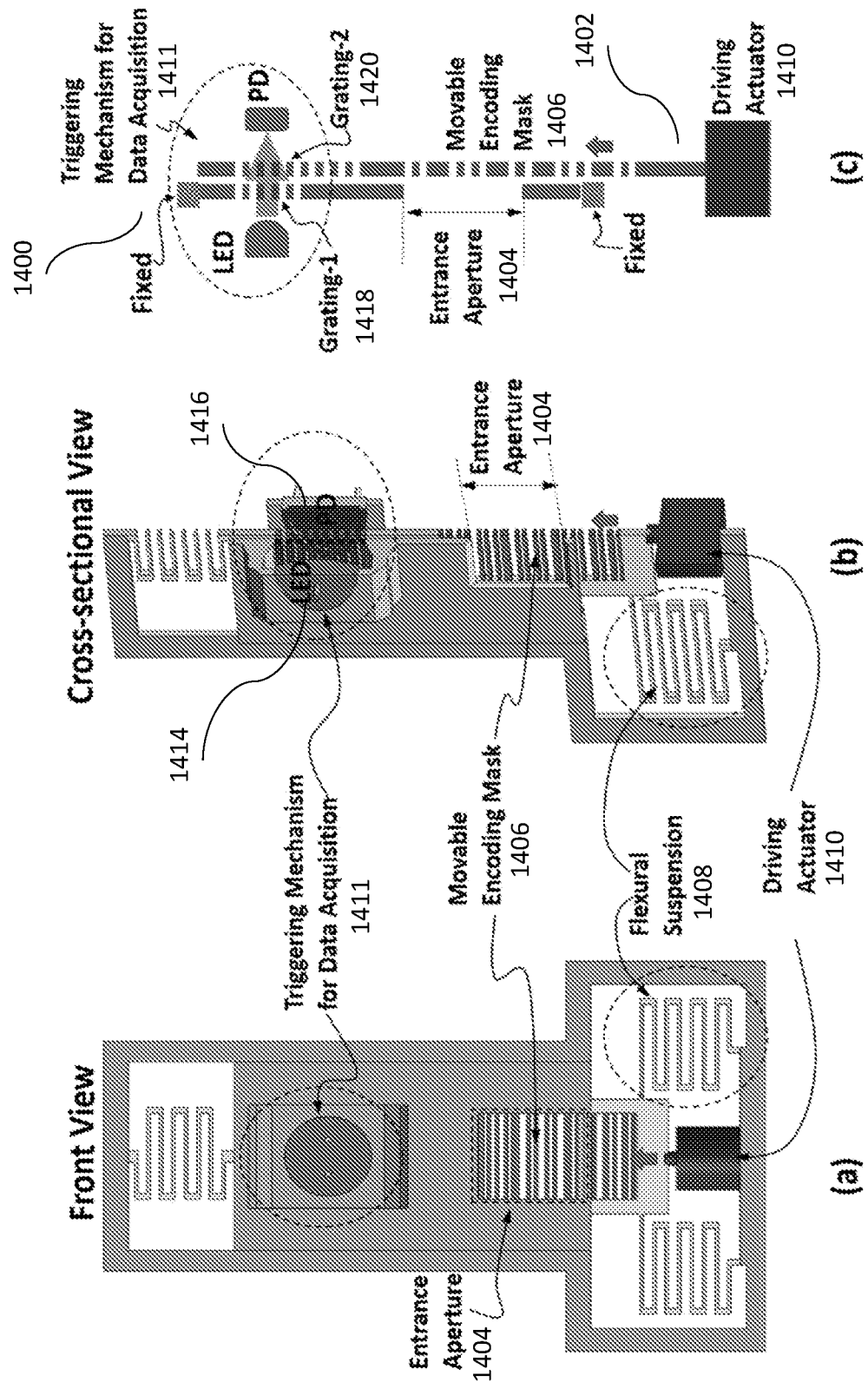
FIG. 14(a) shows a schematic drawing illustrating a front view of an implementation of the encoding mechanism design, according to an example embodiment.
FIG. 14(b) shows a schematic drawing illustrating a cross-sectional view of the implementation of the encoding mechanism design of FIG. 14(a).
FIG. 14(c) shows a schematic drawing illustrating a cross-sectional view of an optical position sensor involving a light emitting diode, a photodetector, and a pair of gratings, according to an example embodiment.

FIG. 14 shows one of many possible ways to implement the encoding mechanism design according to an example embodiment schematically shown in FIG. 12. The front view and cross-sectional views are shown in FIGS. 14(a) and (b), respectively. As shown, the encoding mechanism consists of primarily two layers 1400, 1402, with one 1400 having the entrance aperture 1404 and the other 1402 having the movable mask 1406. The entrance aperture 1404 is fixed and the movable mask 1406 is suspended by some flexural springs 1408 that constrain the mask 1406 movement to only one degree-of-freedom (1DOF) motion along the desired direction. This two-layered structure can be fabricated through a number of ways including, but not limited to, additive manufacturing (i.e. 3D printing), precision machining, and MEMS microfabrication process. In order to achieve high encoding speed and large encoding area (i.e. large mask 1406 movement range), the suspended mask 1406 can be driven in an oscillatory motion at its natural frequency by at least one actuator 1410. Since the mask 1406 executes a continuous motion, a trigger mechanism 1411 including a sensor structure are preferably used to detect the mask 1406 position accurately to trigger the data sampling process when the mask moves to the designated positions to generate required encoding patterns. The sensor structure can, by way of example, not limitation, be piezoresistive (i.e. strain gauges), electromagnetic, piezoelectric, or optical position sensors, and they can be directly integrated on the encoder. In the structural cross-sectional schematic shown in FIG. 14(*c*), an optical position sensor according to a preferred embodiment involving a light emitting diode (LED) 1414, a photodetector (PD) 1416, and a pair of gratings 1418, 1420 is shown as an example. The relative movement of the gratings 1418, 1420 generates oscillating electrical signals that can be used to determine the position of the mask 1406, and thus help to trigger the data acquisition process at the correct mask 1406 locations for the spectrometer system according to example embodiments (compare e.g. FIG. 6) to record the signal from the single pixel detector.

Figure 15:
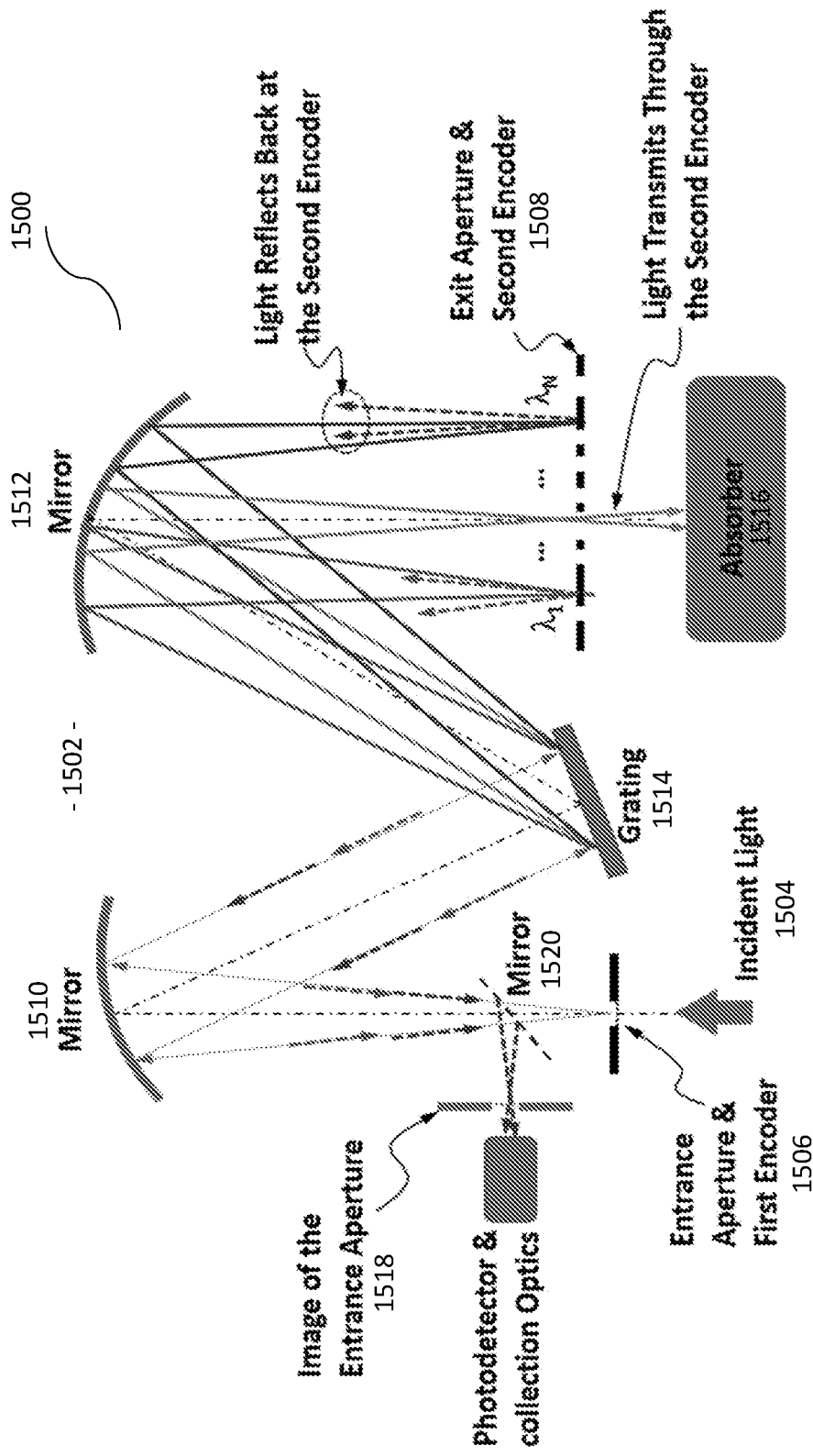
FIG. 15 shows a schematic drawing illustrating a spectrometer in which the dispersion & imaging optics and collection optics here share the same optical setup, according to an example embodiment.

With reference again to the schematic of a spectrometer 600 according to an example embodiment shown in FIG. 6, a modification according to another example embodiment will now be described, which has certain advantages in further miniaturization. As shown in FIG. 15, in a spectrometer 1500 according to such an embodiment the dispersion & imaging optics and collection optics here share the same optical setup 1502. The light 1504 entering the encoded entrance aperture 1506 is dispersed and imaged to the encoded exit aperture 1508 by the dispersion & imaging optics having two mirrors 1510, 1512 and a dispersion element, i.e. diffraction grating 1514. The encoding mechanism is slightly modified at the exit aperture 1508 where the second encoding mask is located. Here, if an encoding pixel is transmissive that allows light to pass through to be absorbed by an absorber 1516, the weightage of that pixel is then "0", or in other words, the pixel is in an "OFF" state. On the contrary, if an encoding pixel is reflective that reflects the light back, then the weightage of that pixel is "1", or in other words, the pixel is in an "ON" state. The reflected light goes back in a nearly identical path in a reversed direction compared with the way it comes from. Hence, the same mirrors 1510, 1512 and grating 1514 now act as the collection optics. This reverse process de-disperses the light beams and brings them to focus to form an image 1518 of the entrance aperture near its physical location in the embodiment described with reference to FIG. 6. To separate the entrance aperture and its image 1518, a mirror 1520 can be employed to reflect the image 1518 of entrance aperture to a different direction as shown in FIG. 15. The mirror 1520 can be located slightly above or below the initial forward going light path in order to avoid the blockage of incoming light, and to facilitate this, the reverse light rays is preferably slightly out of the plane, which can be easily achieved by tilting the second encoder at the encoded exit aperture 1508.

It should be noted that the size of the final focused image 1518 is about the same as the size of the entrance aperture 1506. If the final image 1518 is still larger than the photosensitive area of the detector, concentrators and focusing optics can be inserted between them to match their sizes.

Figure 1:
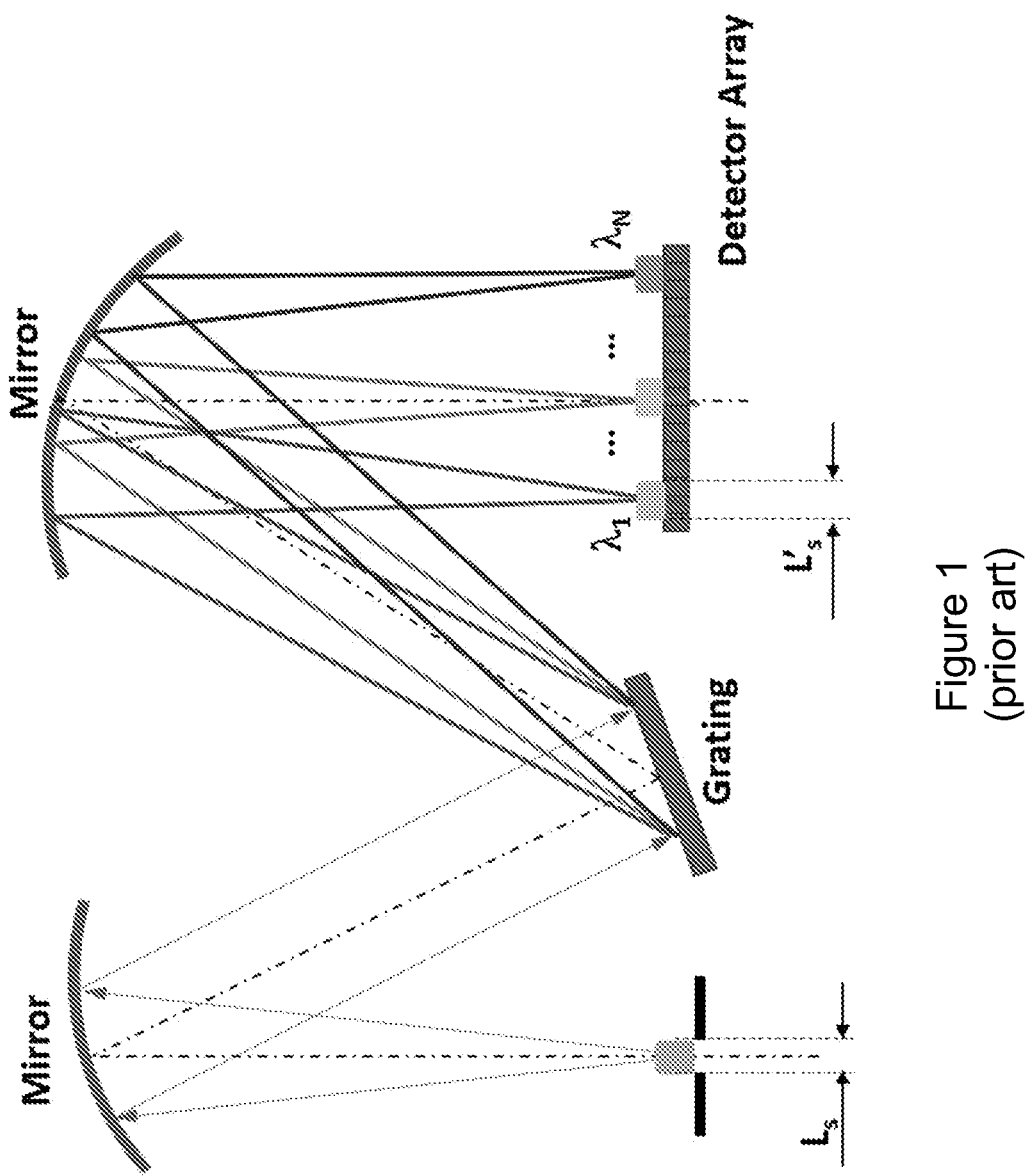
FIG. 1 shows a prior art dispersive spectrometers used in visible and near IR spectral regions.
Figure 2:
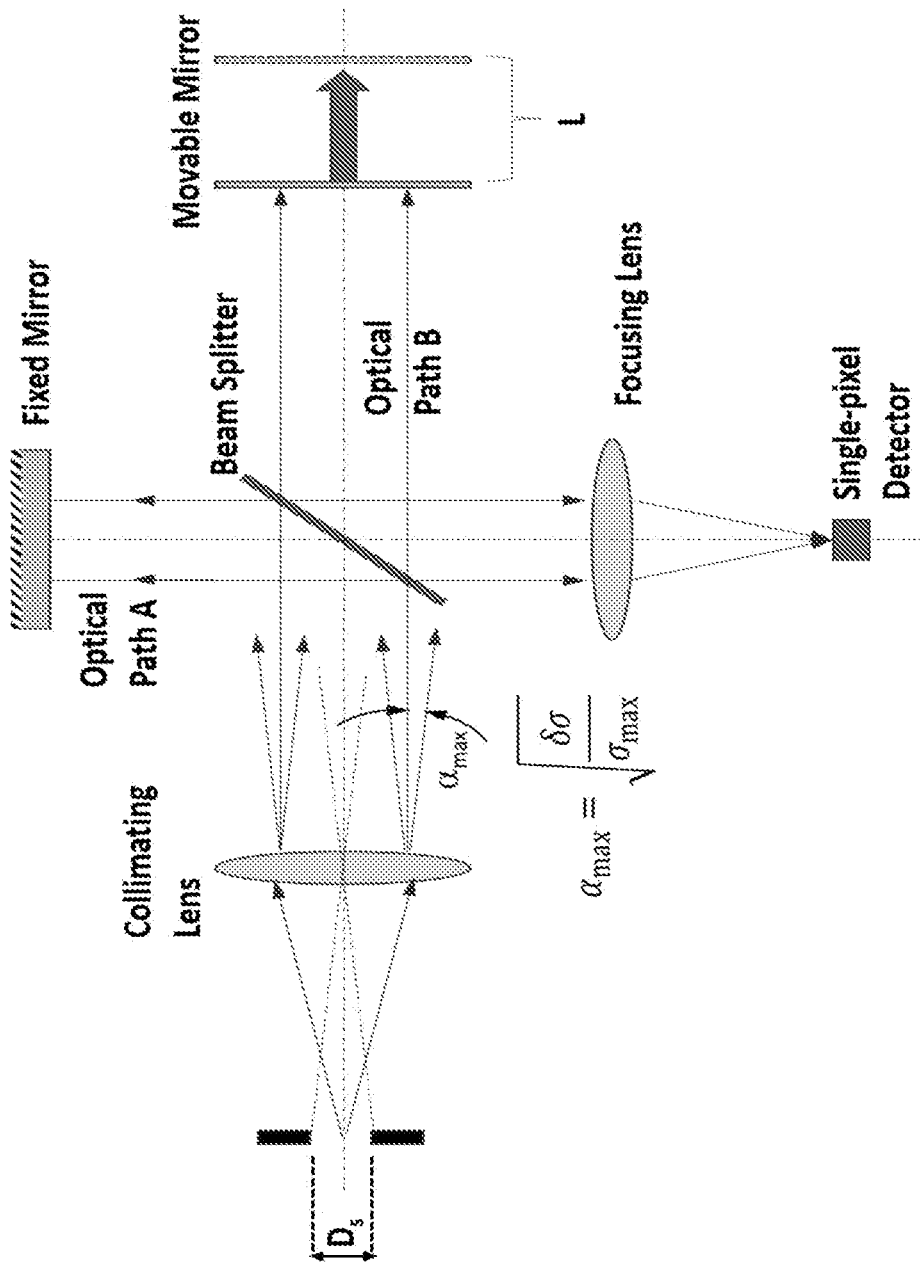
FIG. 2 shows a prior art Michelson interferometer used for construction of FTIR spectrometers.
Figure 3:
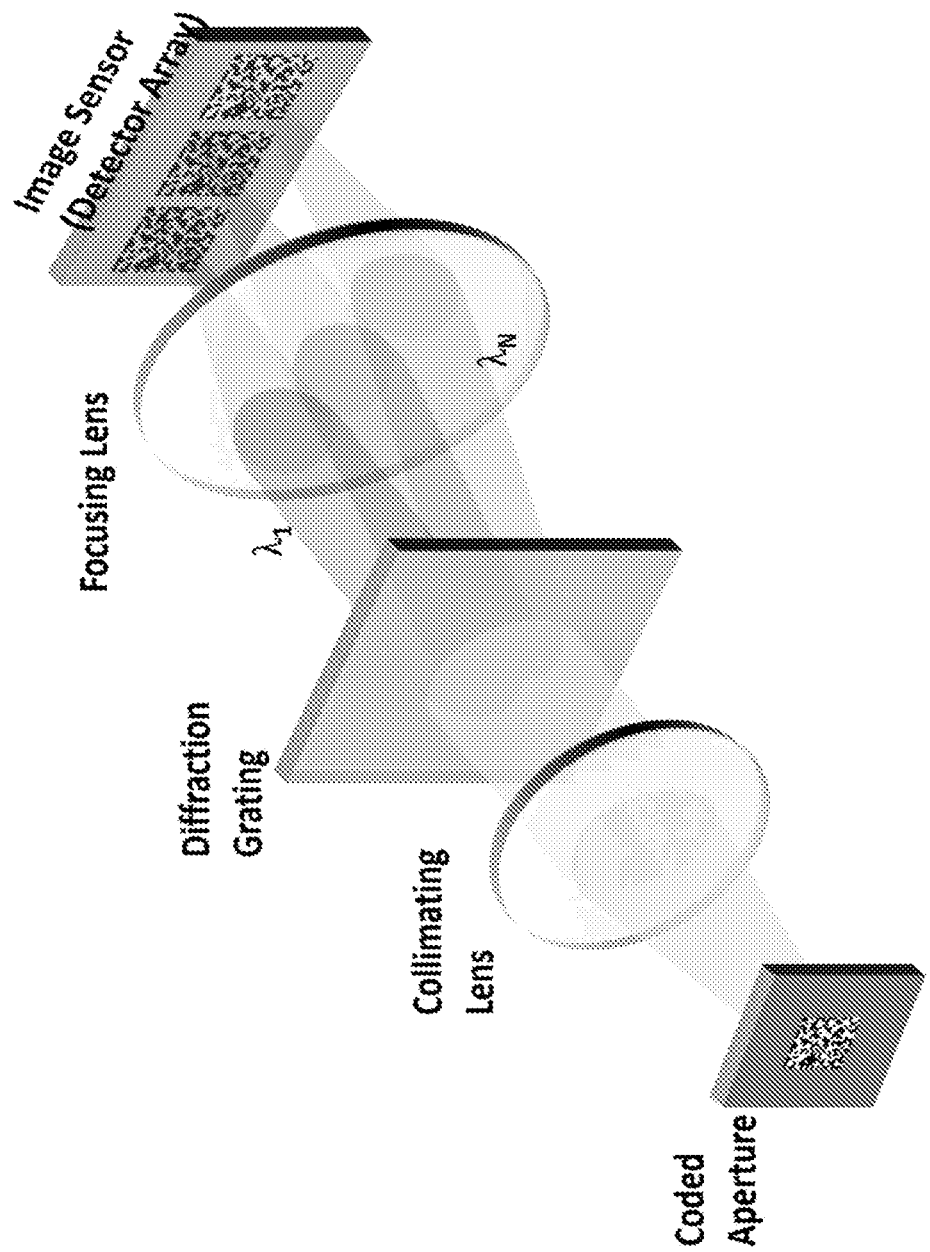
FIG. 3 shows a prior art coded aperture spectrometer.
Figure 4:
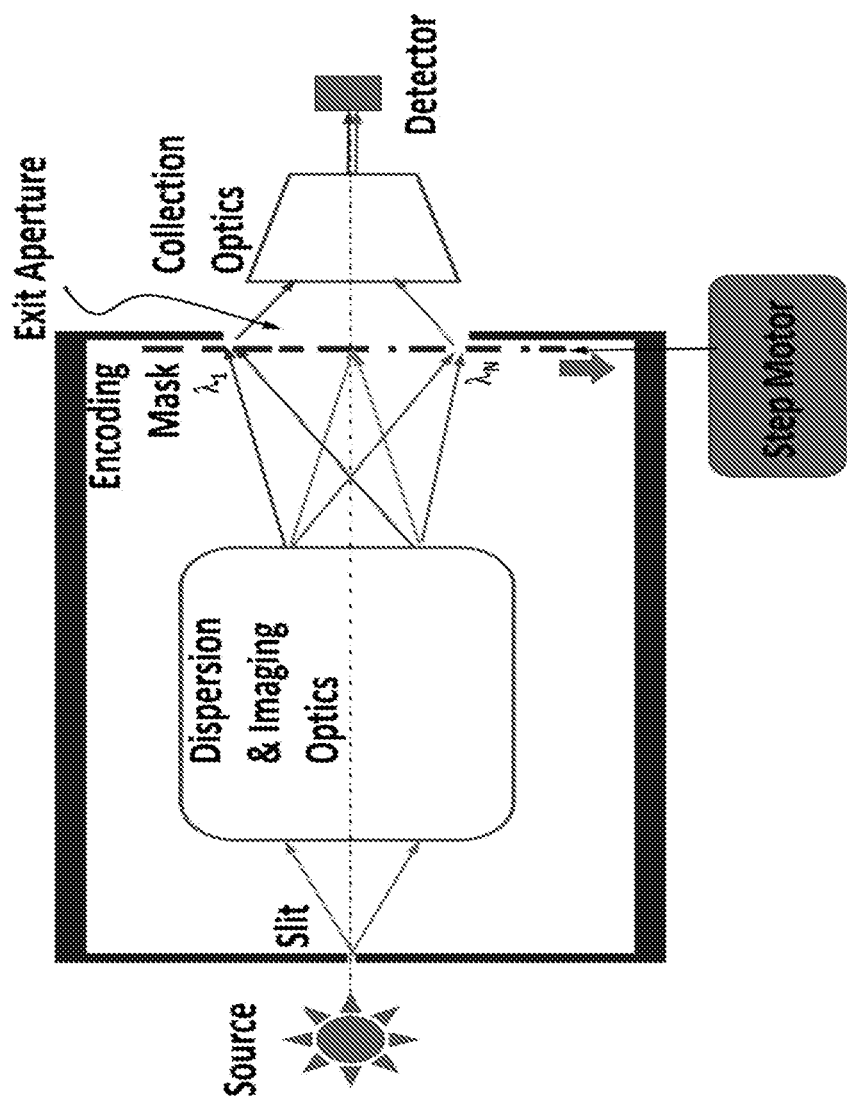
FIG. 4(a) shows a prior art singly encoded, multiplexing mask spectrometer.
FIG. 4(b) shows a prior art doubly encoded, multiplexing mask spectrometer.
FIG. 4(c) shows another prior art doubly encoded, multiplexing mask spectrometer.
Figure 4:
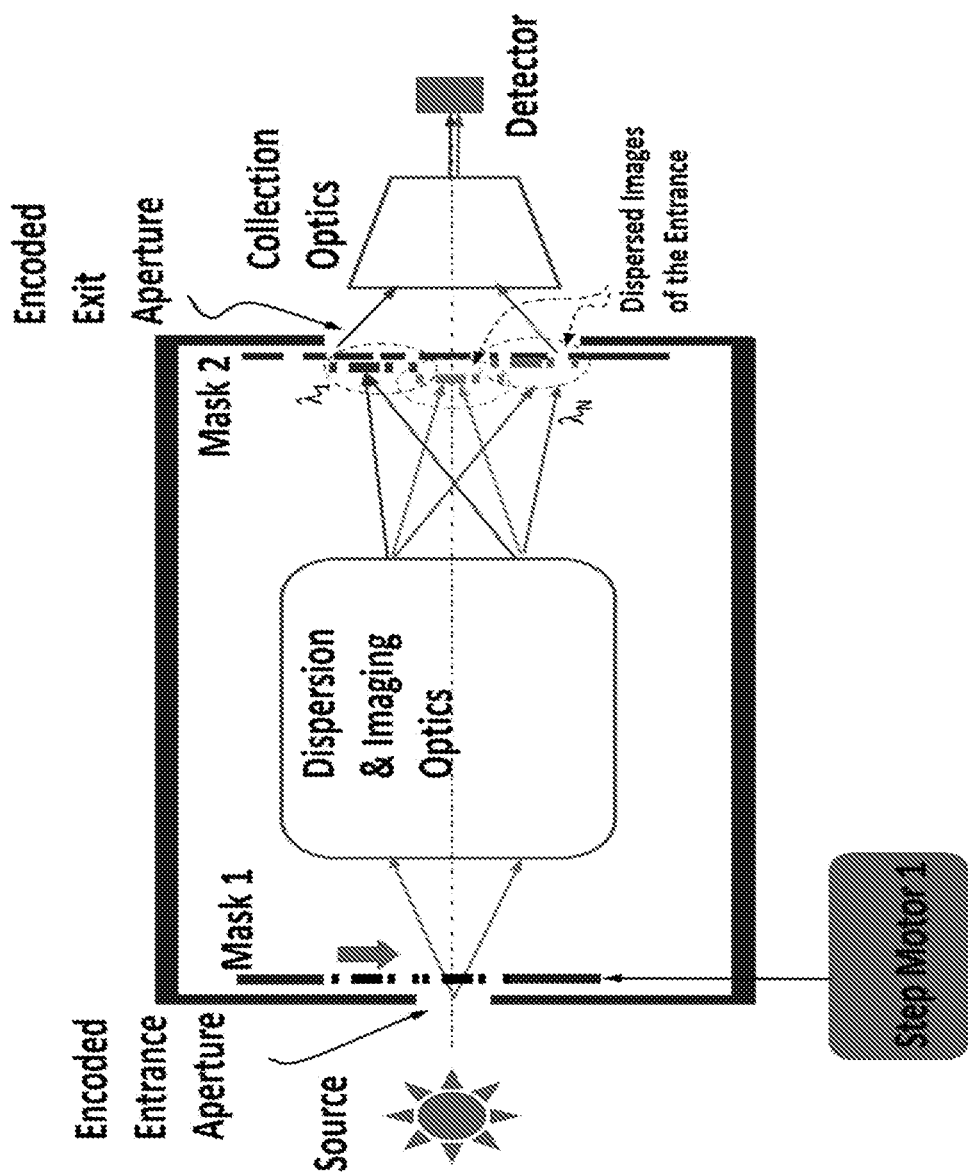

The design shown in FIG. 15 is advantageous because it allows to use a much smaller photodetector and its light collection optics compared with that used directly after the second encoder at the exit aperture in the design as shown in FIG. 6. The above statement is taking into consideration that the exit aperture of a high-resolution spectrometer is typically much larger in size compared with the entrance aperture due to the dispersion. Smaller detectors are usually preferred not only because of their size but also because of their high-speed response and low dark current. Designs in which the same optical setup is shared between the dispersion & imaging optics and the collection optics, but using corner reflectors instead of an encoded exit aperture in reflection mode as in the example embodiment in FIG. 15, can be found in Ref [17], which relates to spectrometers of the type described above with reference to FIG. 4(*a*).

Figure 16:
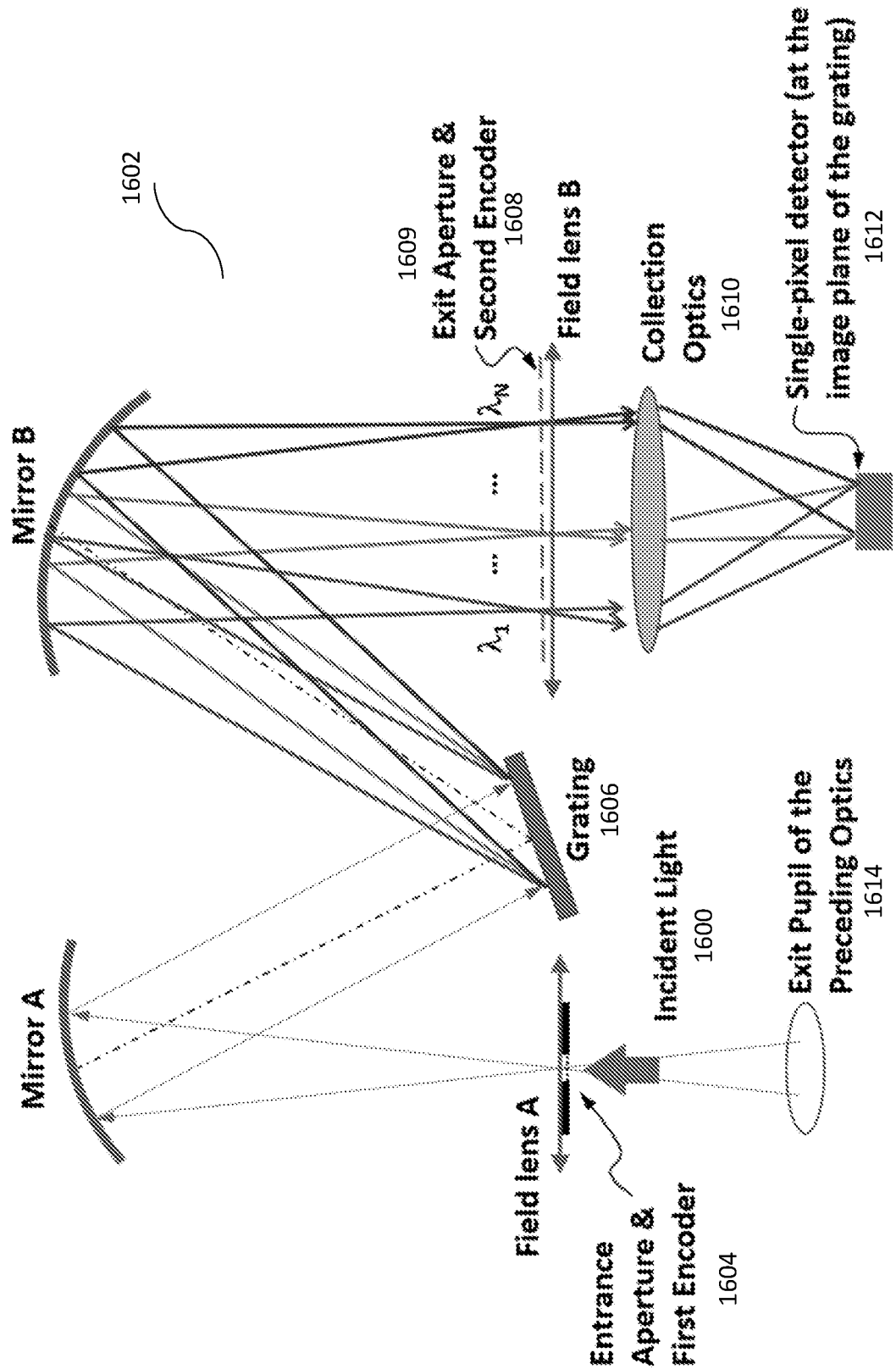
FIG. 16 shows a schematic drawing illustrating a spectrometer using single-pixel detectors with small photosensitive areas, according to an example embodiment.

Other example embodiments are now described to preferably achieve detection using single-pixel detectors with small photosensitive areas. As shown in FIG. 16, the light 1600 enters the system 1602 through an encoded entrance aperture 1604 and propagates through the dispersion & imaging system having two mirrors A and B and a grating 1606 and further generates dispersed images of the entrance at the exit aperture 1608 plane where the second encoder is located. Here, the second encoder 1608 is in a transmission mode. In other words, transmission pixels allow the light to pass and their weightages are "1" and opaque pixels block the light and their weightages are therefore "0". The light passing through the encoded exit aperture 1609 is collected by a collection optics 1610 and focused to the single-pixel photodetector 1612. In this embodiment, imaging collection optics 1610 is used, where light propagates through the collection optics 1610 and forms an image of the grating where the photosensitive area of the single-pixel detector 1612 is placed. It is noted that although the dispersed images of the entrance aperture 1604 can span a large area on the second encoder 1608 to achieve high spectral resolution, they converge as the light propagates through the collection optics 1610 and overlap forming an image of the grating after the collection optics 1610. This process also effectively de-disperses the light beams and brings them to focus to form an image of the grating. Furthermore, the collection optics 1610 can be designed to produce a de-magnified image of the diffraction grating. This collection optics 1610 design in this example embodiment is thus advantageous in reducing the photosensitive area of the detector 1612 that can be used.

Additionally, as shown in FIG. 16, a field lens B can be placed close to the exit aperture 1608 to further decrease the image of the grating thus reducing the detector 1610 size or reduce the size of the collection optics 1610 thus making it more compact. Furthermore, a field lens A can be placed close to the entrance aperture to image the exit pupil of the preceding optics 1614 (i.e. illumination optics etc.) to the diffraction grating 1606, which enhances the light utilization efficiency of the whole spectrometer system 1602 in this example embodiment. It is noted that such field lenses are located at or close to the entrance aperture 1604 and exit aperture 1608 where light is focused, hence they have no or little effect on the spectrometer's resolution and F-number.

Figure 17:
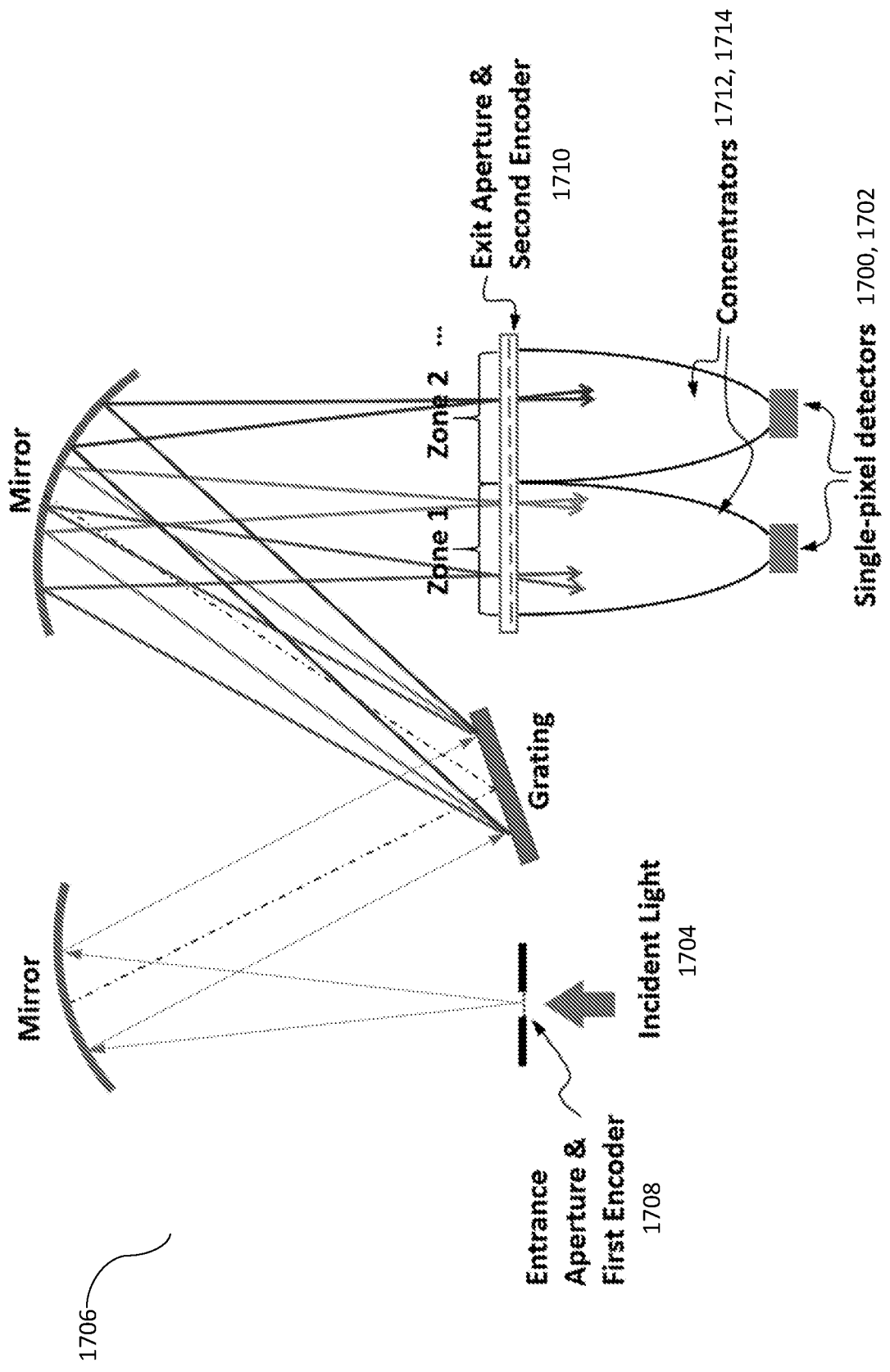
FIG. 17 shows a schematic drawing illustrating a spectrometer with detection using single-pixel detectors with small photosensitive areas, according to an example embodiment.

FIG. 17 further shows an example embodiment that can also achieve detection using single-pixel detectors 1700, 1702 with small photosensitive areas. In this embodiment, non-imaging collection optics is used. As shown, the light 1704 enters the system 1706 through an encoded entrance aperture 1708 and propagates through the dispersion & imaging system and generates dispersed images of the entrance aperture 1708 at the exit aperture plane where the second encoder 1710 is located. Here, the second encoder 1710 is also operated in a transmission mode. The encoded light passing through the encoder 1710 is collected by non-imaging collection optics in the form of concentrators 1712, 1714. Usually, to achieve a high spectral resolution, the dispersed images of the entrance aperture can span a large area on the second encoder. If only one detector 1700 is used, concentrating from a large area on the second encoder to a small photosensitive area on the single-pixel detector 1700 might require an exceedingly large concentration ratio that makes a concentrator design challenging. The problem can however be conveniently solved in this example embodiment by using multiple single-pixel detectors 1700, 1702. As shown in FIG. 17, the area on the second encoder 1710 from which the light is collected is further divided into multiple detection zones with smaller areas, i.e. zone 1, zone 2, and so on. Each zone is then aligned to a light concentrator 1712, 1714 that collects the light passing through it and concentrates to a single-pixel detector 1700, 1702. In this way, the concentration ratio for each light concentrator 1712, 1714 is reduced thus making its design easier. With this embodiment, the total encoded light energy that can transmit through the spectrometer system 1706 is then equal to the summation of the signals from all single-pixel photodetectors 1700, 1702, which is then further used to reconstruct the light spectrum with the method described in this invention.

Figure 18:
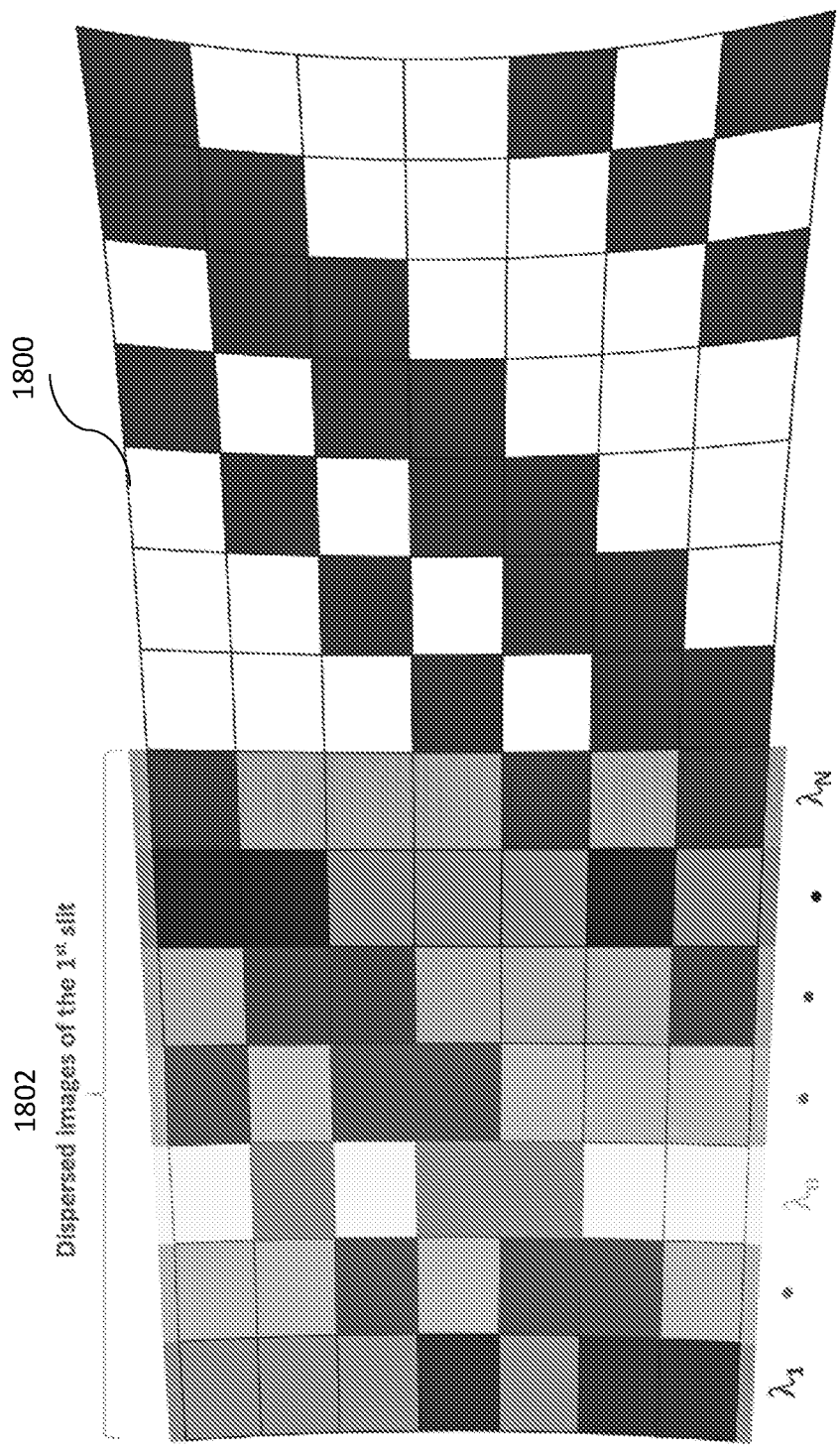
FIG. 18 shows a schematic drawing illustrating the second encoding pattern at the exit aperture plane designed to be distorted to match the distorted images of the entrance slits, according to an example embodiment.

It should be noted that although squares and rectangles are used to denote schematically the encoding pixels of the first and second encoders in the schematic drawings illustrating the various described embodiments, they are not necessarily to be so in practice. In fact, using a distorted encoding pattern might be advantageous in some embodiments, especially for the second encoder. This can be understood in the following way. Suppose one uses straight-line slits and square or rectangle encoding pixels in these slits to form the first encoder at the entrance aperture, the images of these slits might be distorted on the exit aperture plane due to the residual aberrations of the dispersion and imaging system. In this case, as shown in FIG. 18, the second encoding pattern 1800 at the exit aperture plane can be designed to be distorted accordingly to match the distorted images of the slits, e.g. the dispersed image of the $1^{st}$ slit 1802. In this way, the residual optical aberrations have a much less impact on the performance of the spectrometer.

In summary, embodiments of the present invention can provide a method and resulting system to construct a type of new optical spectrometers, which uses single-pixel detectors instead of detector arrays and encodes both entrance and exit apertures to gain the advantages of high throughput, high spectral resolution, and at the same time, ease of miniaturization for portable field uses. Both entrance and exit apertures are encoded along a direction substantially transverse to the dispersion direction to decouple the throughput with the spectral resolution such that the spectrometer can be conveniently designed with high performance in a compact package. MEMS technology can be further utilized to achieve the miniaturization of the spectrometer. The applications of such spectrometers can be quite broad.

In one embodiment, a spectrometer for detecting an electromagnetic (EM) wave spectrum having one or more wavelength components within a spectral band of interest is provided, comprising an entrance aperture; a dispersion and imaging optics containing at least one dispersion element; an exit aperture; a collection optics; and at least one single-pixel detector, each single-pixel detector sensitive to one or more of the wavelength components; wherein the entrance aperture comprises at least one entrance slit that is spatially encoded along a direction substantially transverse to a direction of dispersion of the dispersion and imaging optics; wherein the dispersion and imaging optics is configured to create dispersed images of the entrance aperture on a plane of the exit aperture, such that respective images at the different wavelength components are offset by different amounts of displacements along the direction of dispersion; wherein the exit aperture comprises a plurality of exit slits arranged in the direction of dispersion, wherein each exit slit is spatially encoded along the direction substantially transverse to the direction of dispersion; wherein the collection optics is configured to gather a total EM wave energy that enters the entrance aperture and exits the exit aperture to one of the at least one single-pixel detectors; wherein at least one of an encoding pattern of the at least one entrance slits and an encoding pattern of the plurality of exit slits is adjustable and configured to be changed for a number of times; the spectrometer further comprising a measurement unit configured to measure the output of the at least one detector for respective ones of the number of times for reconstructing the EM wave spectrum.

The adjustable encoding pattern of the at least one entrance slits and/or of the plurality of exit slits may be implemented using microelectromechanical systems (MEMS) technology. The adjustable encoding pattern of the at least one entrance slits and/or of the plurality of exit slits may be implemented using MEMS micromirror arrays.

The adjustable encoding pattern of the at least one entrance slits and/or of the plurality of exit slits may be implemented using a movable mask placed in the vicinity of a fix aperture opening. The movable mask may be moveable along a preferred direction, and the preferred direction is along the direction of dispersion or perpendicular to the direction of dispersion or any other directions. The movable mask may be suspended by springs, and the mask is configured to be driven into an oscillatory motion at its natural frequency to gain the advantage of high-speed and large area encoding.

The dispersion and imaging optics and the collection optics may be configured to share, in part or in whole, the same optics elements. The encoding pattern of the plurality of exit slits may be configured to be operated in a reflection mode.

The collection optics may comprise imaging collection optics forming an image of the at least one dispersion element on a photosensitive area of the at least one single-pixel detector. The spectrometer may comprise a first field lens B placed adjacent the exit aperture to further decrease the image on the photosensitive area of the at least one single-pixel detector or reduce the size of the collection optics.

The spectrometer may further comprise a second field lens placed adjacent the entrance aperture to image an exit pupil of preceding optics onto the at least one dispersion element.

The spectrometer may comprise non-imaging collection optics such as a concentrator concentrating light from the exit aperture onto a photosensitive area of the at least one single-pixel detector. The non-imaging collection optics may comprise a plurality of concentrators, each concentrating a portion of the light from the exit aperture onto a photosensitive area of respective one of a plurality of detectors.

The encoding pixels for at least the exit aperture may be configured to match distorted images of the slits of the entrance aperture.

The entrance aperture may comprise a plurality of entrance slits with no gaps or with narrow, non-zero gaps therebetween.

The exit aperture may comprise a plurality of exit slits with no gaps or with narrow, non-zero gaps therebetween.

Figure 19:
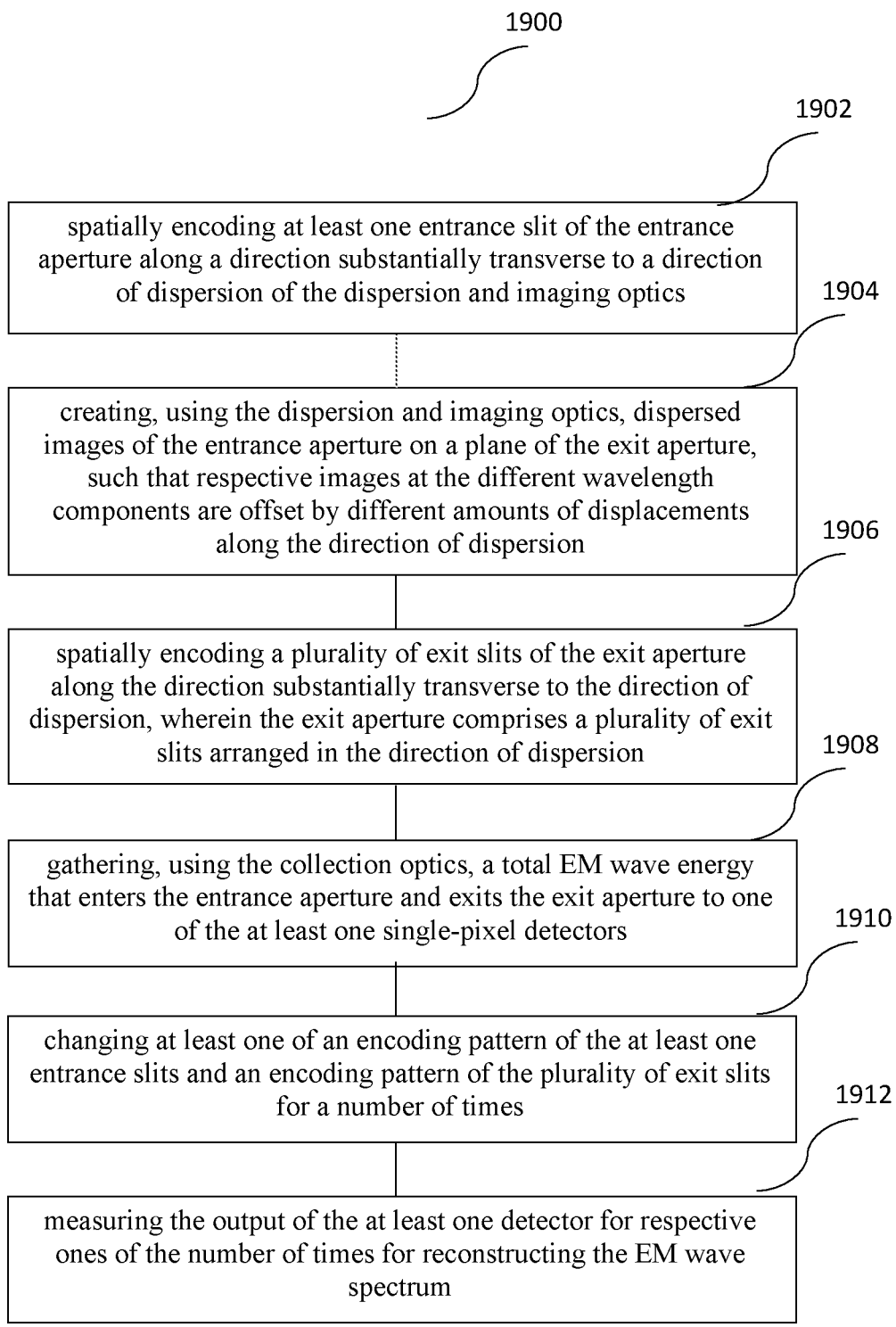
FIG. 19 shows a flowchart illustrating a method of detecting an electromagnetic (EM) wave spectrum having one or more wavelength components within a spectral band of interest, according to an example embodiment.

FIG. 19 shows a flowchart 1900 illustrating a method of detecting an electromagnetic (EM) wave spectrum having one or more wavelength components within a spectral band of interest, according to an example embodiment, using an entrance aperture; a dispersion and imaging optics containing at least one dispersion element; an exit aperture; a collection optics; and at least one single-pixel detector, each single-pixel detector sensitive to one or more of the wavelength components. At step 1902, at least one entrance slit of the entrance aperture is spatially encoded along a direction substantially transverse to a direction of dispersion of the dispersion and imaging optics. At step 1904, dispersed images of the entrance aperture are created, using the dispersion and imaging optics, on a plane of the exit aperture, such that respective images at the different wavelength components are offset by different amounts of displacements along the direction of dispersion. At step 1906, a plurality of exit slits of the exit aperture are spatially encoded along the direction substantially transverse to the direction of dispersion, wherein the exit aperture comprises a plurality of exit slits arranged in the direction of dispersion. At step 1908, a total EM wave energy that enters the entrance aperture and exits the exit aperture to one of the at least one single-pixel detectors is gathered, using the collection optics. At step 1910, at least one of an encoding pattern of the at least one entrance slits and an encoding pattern of the plurality of exit slits is changed for a number of time. At step 1912, the output of the at least one detector is measured for respective ones of the number of times for reconstructing the EM wave spectrum.

Embodiments of the present invention can have one or more of the following features and associated benefits/advantages.

| Feature | Benefit/Advantage |
| --- | --- |
| Uses single-pixel photodetectors AND encodes both entrance and exit apertures | Cost-effective operation at UV and/or IR wavelengths, where image sensors/detector arrays are expensive. Providing multiplexing advantage to support high SNR. Enabling large throughput thus significantly enhancing light-gathering power. |
| Encodes both entrance and exit apertures along a direction substantially transverse to the direction of dispersion | Decoupling the throughput and spectral resolution, thus facilitating optical layout design and aberration minimization in a compact package. Can have both the multiplexing and throughput advantages. |
| Uses microelectromechanical systems technology | Enabling further miniaturization. |

That is, the spectrometer system according to example embodiments can have one or more of the following distinct advantages.

Compared with dispersive spectrometers, it has the advantages of FTIR spectrometers, namely the multiplexing advantage hence supporting high SNR detection and the use of single-element photodetector hence being capable of cost-effective operation at IR wavelengths.

Compared with FTIR spectrometers, it has the advantages of dispersive spectrometers. More specifically, the technology is not based on optical interferometers hence is more robust and less sensitive to external disturbances, thus facilitating miniaturization for field uses.

Most importantly, the proposed spectrometer system has a significantly larger entrance aperture compared with either a dispersive grating spectrometer or a FTIR spectrometer, thus allowing it to gather more light power and subsequently provide enhanced SNR.

Embodiments of the present invention can thus potentially enable high spectral resolution portable IR spectrometers that may facilitate on-site detection and analysis of materials in real-time. Due to the advantages stated above, the spectrometer constructed based on this invention shall be robust, less sensitive to external disturbances, high spectral resolution within the spectral band of interest, and high throughput (i.e. the ability to gather more light energy). Embodiments of the present invention can be constructed with relatively low cost. The application opportunities include stand-alone handheld modules or portable spectrometer modules in combination with smart phones for a range of new possibilities for sensing in agriculture, environment monitoring, healthcare, industrial process monitoring, and many others.

For example, embodiments of the present invention could be used to develop handheld IR or Raman spectrometers with high spectral resolution for field uses in a range of applications include, but are not limited to, industrial process control, materials (especially polymers and plastics) identification and verification, environment monitoring, sensors for internet of things (IoTs), biomedical point of care testing, food and beverage quality assessment, analysis of coatings and films, forensics and law enforcement, as well as pharmaceutical research and drug development.

Aspects of the systems and methods described herein such as the movement of components of the spectrometer and the analysis of the detected signal may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the system include: microcontrollers with memory (such as electronically erasable programmable read only memory (EEPROM)), embedded microprocessors, firmware, software, etc. Furthermore, aspects of the system may be embodied in microprocessors having software-based circuit emulation, discrete logic (sequential and combinatorial), custom devices, fuzzy (neural) logic, quantum devices, and hybrids of any of the above device types.

Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

The above description of illustrated embodiments of the systems and methods is not intended to be exhaustive or to limit the systems and methods to the precise forms disclosed. While specific embodiments of, and examples for, the systems components and methods are described herein for illustrative purposes, various equivalent modifications are possible within the scope of the systems, components and methods, as those skilled in the relevant art will recognize.

The teachings of the systems and methods provided herein can be applied to other processing systems and methods, not only for the systems and methods described above.

The elements and acts of the various embodiments described above can be combined to provide further embodiments. These and other changes can be made to the systems and methods in light of the above detailed description.

In general, in the following claims, the terms used should not be construed to limit the systems and methods to the specific embodiments disclosed in the specification and the claims, but should be construed to include all processing systems that operate under the claims. Accordingly, the systems and methods are not limited by the disclosure, but instead the scope of the systems and methods is to be determined entirely by the claims.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

REFERENCES

[1] R. J. Bell, Introductory Fourier Transform Spectroscopy, Academic Press, New York and London, 1972.

[2] http://sa-photonics.com/products/spectroscopy-systems/modular-ir-fourier-spectrometers-2/

[3] M. E. Gehm, S. T. McCain, N. P. Pitsianis, D. J. Brady, P. Potuluri, and M. E. Sullivan, "Static two-dimensional aperture coding for multimodal, multiplex spectroscopy," Applied Optics, Vol. 45, No. 13, p. 2965 (2006).

[4] R. N. Ibbett, D. Aspinall, and J. F. Grainger, "Real-Time Multiplexing of Dispersed Spectra in Any Wavelength Region," Applied Optics, Vol. 7, No. 6, p. 1089 (1968).

[5] M. J. E. Golay, "Static multislit spectrometry, and its application to the panoramic display of infrared spectra," J.O.S.A, Vol. 41, p 468 (1951).

[6] A. Girard, "Spectrometre a Grilles," Applied Optics, Vol. 2, No. 1, p. 79 (1963).

[7] M. Harwit, P. G. Phillips, T. Fine, and N. J. A. Sloane, "Doubly Multiplexed Dispersive Spectrometers," Applied Optics, Vol. 9, No. 5, p. 1149 (1970).

[8] M. Harwit, P. G. Phillips, L. W. King, and D. A. Briotta Jr., "Two Asymmetric Hadamard Transform Spectrometers," Applied Optics, Vol. 13, No. 11, p. 2669 (1974).

[9] M. Harwit and N. J. A. Sloane, "Hadamard Transform Optics," Academic Press, New York, 1979.

[10] Z. Lu, J. Zhang, H. Liu, J. Xu, and J. Li, "The Improvement on the Performance of DMD Hadamard Transform Near-Infrared Spectrometer by Double Filter Strategy and a New Hadamard Mask," Micromachines 2019, 10, 149; doi:10.3390/mi10020149.

[11] P. Nelson, "DLP®Technology for Spectroscopy," white paper from TI, online: http://www.ti.com/lit/wp/dlpa048a/dlpa048a.pdf [12] B. Lee, "Introduction to ±12 Degree Orthogonal Digital Micromirror Devices (DMDs)," online document from TI, http://www.ti.com/lit/an/dlpa008b/dlpa008b.pdf [13] https://en.wikipedia.org/wiki/Nonimaging_optics [14] E. J. Candès, J. K. Romberg, and T. Tao, "Stable signal recovery from incomplete and inaccurate measurements," Communications on Pure and Applied Mathematics, Vol. 59 (8), p. 1207-1223 (2006).

[15] https://en.wikipedia.org/wiki/Moore%E2%80%93Penrose_inverse

[16] https://en.wikipedia.org/wiki/Circulant_matrix [17] J. A. Decker Jr., "Experimental Realization of the Multiplex Advantage with a Hadamard-Transform Spectrometer," Applied Optics, Vol. 10, No. 3, p. 510 (1971).

I claim:

1. A spectrometer for detecting an electromagnetic (EM) wave spectrum having one or more wavelength components within a spectral band of interest, comprising:
   an entrance aperture;
   a dispersion and imaging optics containing at least one dispersion element;
   an exit aperture;
   a collection optics; and
   at least one single-pixel detector, each single-pixel detector sensitive to one or more of the wavelength components;
   wherein the entrance aperture comprises at least one entrance slit that is spatially encoded along a direction substantially transverse to a direction of dispersion of the dispersion and imaging optics;
   wherein the dispersion and imaging optics is configured to create dispersed images of the entrance aperture on a plane of the exit aperture, such that respective images at the different wavelength components are offset by different amounts of displacements along the direction of dispersion;
   wherein the exit aperture comprises a plurality of exit slits arranged in the direction of dispersion, wherein each exit slit is spatially encoded along the direction substantially transverse to the direction of dispersion;
   wherein the collection optics is configured to gather a total EM wave energy that enters the entrance aperture and exits the exit aperture to one of the at least one single-pixel detectors;
   wherein at least one of an encoding pattern of the at least one entrance slits and an encoding pattern of the plurality of exit slits is adjustable and configured to be changed for a number of times;
   wherein the spectrometer is configured to measure the output signal of the at least one detector for respective ones of the number of times for reconstructing the EM wave spectrum; and
   wherein the spectrometer is configured such that an image width of a single one of the entrance slits at a single wavelength is smaller than a spot size of the spectrometer at the exit aperture such that a spectral resolution of the spectrometer is independent of the number of single entrance slits comprised in the entrance aperture.

2. The spectrometer of claim 1, wherein the adjustable encoding pattern of the at least one entrance slits and/or of the plurality of exit slits is implemented using microelectromechanical systems (MEMS) technology.

3. The spectrometer of claim 2, wherein the adjustable encoding pattern of the at least one entrance slits and/or of the plurality of exit slits is implemented using MEMS micromirror arrays.

4. The spectrometer of claim 1, wherein the adjustable encoding pattern of the at least one entrance slits and/or of the plurality of exit slits is implemented using a movable mask placed in the vicinity of a fix aperture opening.

5. The spectrometer of claim 4, wherein the movable mask is moveable along a preferred direction, and the preferred direction is along the direction of dispersion or perpendicular to the direction of dispersion or any other directions.

6. The spectrometer of claim 4, wherein the movable mask is suspended by springs, and the mask is configured to be driven into an oscillatory motion at its natural frequency to gain the advantage of high-speed and large area encoding.

7. The spectrometer of claim 1, wherein the dispersion and imaging optics and the collection optics, respectively, share one or more optics elements.

8. The spectrometer of claim 7, wherein the encoding pattern of the plurality of exit slits is configured to be operated in a reflection mode.

9. The spectrometer of claim 1, wherein the collection optics comprises imaging collection optics forming an image of the at least one dispersion element on a photosensitive area of the at least one single-pixel detector.

10. The spectrometer of claim 9, wherein the spectrometer comprises a first field lens B placed adjacent the exit aperture to further decrease the image on the photosensitive area of the at least one single-pixel detector or reduce the size of the collection optics.

11. The spectrometer of claim 1, wherein the spectrometer further comprises a second field lens placed adjacent the entrance aperture to image an exit pupil of preceding optics onto the at least one dispersion element.

12. The spectrometer of claim 1, wherein the spectrometer comprises non-imaging collection optics such as a concentrator concentrating light from the exit aperture onto a photosensitive area of the at least one single-pixel detector.

13. The spectrometer of claim 12, wherein the non-imaging collection optics comprises a plurality of concentrators, each concentrating a portion of the light from the exit aperture onto a photosensitive area of respective one of a plurality of detectors.

14. The spectrometer of claim 1, wherein the encoding pixels for at least the exit aperture are configured to match distorted images of the slits of the entrance aperture.

15. The spectrometer of claim 1, wherein the entrance aperture comprises a plurality of entrance slits with no gaps or with narrow, non-zero gaps therebetween.

16. The spectrometer of claim 1, wherein the exit aperture comprises a plurality of exit slits with no gaps or with narrow, non-zero gaps therebetween.

17. A method of detecting an electromagnetic (EM) wave spectrum having one or more wavelength components within a spectral band of interest, using:
an entrance aperture;
a dispersion and imaging optics containing at least one dispersion element;
an exit aperture;
a collection optics; and
at least one single-pixel detector, each single-pixel detector sensitive to one or more of the wavelength components;
the method comprising the steps of:
spatially encoding at least one entrance slit of the entrance aperture along a direction substantially transverse to a direction of dispersion of the dispersion and imaging optics;
creating, using the dispersion and imaging optics, dispersed images of the entrance aperture on a plane of the exit aperture, such that respective images at the different wavelength components are offset by different amounts of displacements along the direction of dispersion;
spatially encoding a plurality of exit slits of the exit aperture along the direction substantially transverse to the direction of dispersion, wherein the exit aperture comprises a plurality of exit slits arranged in the direction of dispersion;
gathering, using the collection optics, a total EM wave energy that enters the entrance aperture and exits the exit aperture to one of the at least one single-pixel detectors, wherein an image width of a single one of the entrance slits is at a single wavelength component smaller than a spot size of the spectrometer at the exit aperture such that a spectral resolution of the spectrometer is independent of the number of single entrance slits comprised in the entrance aperture;
changing at least one of an encoding pattern of the at least one entrance slits and an encoding pattern of the plurality of exit slits for a number of times; and
measuring the output of the at least one detector for respective ones of the number of times for reconstructing the EM wave spectrum.

* * * * *